United States Patent
Schriber et al.

(10) Patent No.: US 10,977,287 B2
(45) Date of Patent: Apr. 13, 2021

(54) AUTOMATED STORYBOARDING BASED ON NATURAL LANGUAGE PROCESSING AND 2D/3D PRE-VISUALIZATION

(71) Applicant: Disney Enterprises, Inc., Burbank, CA (US)

(72) Inventors: Sasha Anna Schriber, Zurich (CH); Isabel Simo, Ullastrell (ES); Justine Fung, Zollikerberg (CH); Daniel Inversini, Langenthal (CH); Carolina Ferrari, Zurich (CH); Max Grosse, Zurich (CH); Markus Gross, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 98 days.

(21) Appl. No.: 16/155,775

(22) Filed: Oct. 9, 2018

(65) Prior Publication Data

US 2019/0155829 A1 May 23, 2019

Related U.S. Application Data

(60) Provisional application No. 62/569,097, filed on Oct. 6, 2017.

(51) Int. Cl.
*G06F 16/34* (2019.01)
*G06F 3/0482* (2013.01)
(Continued)

(52) U.S. Cl.
CPC ........... *G06F 16/34* (2019.01); *G06F 3/0482* (2013.01); *G06F 3/0484* (2013.01); *G06F 3/167* (2013.01);
(Continued)

(58) Field of Classification Search
CPC ...... G06F 16/34; G06F 16/383; G06F 40/205; G06F 40/30; G06F 3/0482; G06F 3/0484;
(Continued)

(56) References Cited

U.S. PATENT DOCUMENTS

| | | | |
|---|---|---|---|
| 8,830,243 B2 | 9/2014 | Lee et al. | |
| 9,106,812 B1 * | 8/2015 | Price | H04N 21/8549 |

(Continued)

FOREIGN PATENT DOCUMENTS

GB 2519312 A 4/2015

OTHER PUBLICATIONS

European Search Report in EP Patent Application No. 18198825, dated Jan. 16, 2019.

(Continued)

*Primary Examiner* — Mohammad K Islam
(74) *Attorney, Agent, or Firm* — Artegis Law Group, LLP

(57) ABSTRACT

Systems and methods are provided for a workflow framework that scriptwriters can utilize when developing scripts. A script can be parsed to identify one or more elements in a script, and various visual representations of the one or more elements and/or a scene characterized in the script can be automatically generated. A user may develop or edit the script which can be presented in a visual and temporal manner. Information parsed from the script can be stored in basic information elements, and used to create a knowledge bases.

20 Claims, 25 Drawing Sheets

(51) Int. Cl.
*G06F 3/16* (2006.01)
*G06F 3/0484* (2013.01)
*G06F 40/30* (2020.01)
*G06F 40/205* (2020.01)
*G06F 16/383* (2019.01)
*G06N 5/04* (2006.01)
*G06T 13/40* (2011.01)
*G06T 13/80* (2011.01)

(52) U.S. Cl.
CPC .......... *G06F 16/383* (2019.01); *G06F 40/205* (2020.01); *G06F 40/30* (2020.01); *G06N 5/04* (2013.01); *G06T 13/40* (2013.01); *G06T 13/80* (2013.01)

(58) Field of Classification Search
CPC ........... G06F 3/167; G06N 5/04; G06T 13/40; G06T 13/80
See application file for complete search history.

(56) References Cited

U.S. PATENT DOCUMENTS

| | | | |
|---|---|---|---|
| 10,055,494 B1* | 8/2018 | Bordenet | G11B 27/34 |
| 10,372,801 B2* | 8/2019 | Kokemohr | G06F 3/04845 |
| 10,623,831 B1* | 4/2020 | Paul | G06F 3/0482 |
| 2007/0147654 A1 | 6/2007 | Clatworthy et al. | |
| 2008/0007567 A1 | 1/2008 | Clatworthy et al. | |
| 2009/0201298 A1 | 8/2009 | Jung | |
| 2011/0102424 A1 | 5/2011 | Hibbert et al. | |
| 2013/0305153 A1* | 11/2013 | Schwarz | G06F 3/0484 715/716 |
| 2014/0019865 A1* | 1/2014 | Shah | A63F 13/10 715/731 |
| 2014/0282013 A1* | 9/2014 | Amijee | G06F 3/0482 715/732 |
| 2015/0371423 A1* | 12/2015 | Rubin | G06F 40/40 345/419 |
| 2017/0024095 A1 | 1/2017 | Glasgow | |
| 2018/0276004 A1* | 9/2018 | Bache | G06F 8/38 |
| 2019/0107927 A1* | 4/2019 | Schriber | G06N 5/04 |
| 2019/0138923 A1* | 5/2019 | Jacobs | G06F 16/367 |

OTHER PUBLICATIONS

Final Office Action received for U.S. Appl. No. 16/155,799, dated Mar. 19, 2020, 14 pages.

Non-Final Office Action received for U.S. Appl. No. 16/155,799, dated Nov. 18, 2019, 17 pages.

* cited by examiner

| Parse Request Message | | |
|---|---|---|
| Name | Type | Description |
| | String | The type of the message – "ParseRequest" |
| Key | String | A unique identifier for the message. |
| ID | String | |
| Project | String | A unique identifier for the project that sent this message. |
| Scene | String | A unique identifier for the scene that sent this message. |
| Module | String | A unique identifier for the module that sent this message. |
| Text | String | The text to parse. |
| Speaker | String | String – "action" if it is an action; "question" if it is a question; name of the actor if it is a sentence said by this person during a dialog. |
| Meta | Map | Dictionary Key Value Pair. |
| SceneActors | Map | The actors in the current scene. |
| Identify | String | A unique identifier for the actor. |
| Name | String | The text necessarily unique] name of the actor. |
| SceneObjects | Map | The objects in the current scene. |
| Identify | String | A unique identifier for the object. |
| Name | String | The text necessarily unique] name of the object. |
| ProjectActors | Map | The actors in the current project. |
| Identify | String | A unique identifier for the actor. |
| Name | String | The text necessarily unique] name of the actor. |
| ProjectObjects | Map | The objects in the current project. |
| Identify | String | A unique identifier for the object. |
| Name | String | The text necessarily unique] name of the object. |

Piece Interaction Group Request Message

| Name | | | | | Type | Description |
|---|---|---|---|---|---|---|
| Key | | | | | String | The type of the message - "PieceInteractionGroupRequest" |
| Affordances | | | | | Array | |
| | Affordance | | | | Map | |
| | | ID | | | Integer | |
| | | Type | | | String | e.g. "GoTo" |
| | | Owner | | | String | |
| | | Users | | | Array | |
| | | | User | | Map | |
| | | | | IsActor | Boolean | If the target is another actor |
| | | | | Name | String | Name of the target object |
| | StartTime | | | | Float | |
| | EndTime | | | | Float | |

FIG. 6A

Parse Interaction Group Result Message

| Name | Type | Description |
|---|---|---|
| Key | String | The type of the message -- "ParseInteractionGroupResult" |
| Groups | Array | |
| Group | Map | |
| ID | Integer | |
| StartTime | Float | |
| EndTime | Float | |
| Actors | Array | |
| Actor | String | |

FIG. 6B

```
public ApplicationProxy(Application application, Container con)
{
    _application = application;
    _con = con;

AffordanceStorage = new IAffordanceStorageProxy(_application, _con);

// Getters/setters
    GetAffordances = new Func<object, Task<object>>(_getAffordances);

// Functions
    LoadProject = new Func<object, Task<object>>(_LoadProject);
    SaveProject = new Func<object, Task<object>>(_SaveProject);
    CreateTemporaryProject = new Func<object, Task<object>>(_CreateTemporaryProject);
    PushDefaults = new Func<object, Task<object>>(_pushDefaults);
}
```

FIG. 7

| Sentences | Rule |
|---|---|
| If Adam is tired on Sunday, then he does not go to church. | belief(Id, adam, go, null, true, to, church, null) :-<br>timeof(Id, sunday),<br>belief(Id, adam, be, tire, false). |
| If Adam does not get a candy, then he becomes angry. | state(Id, adam, angry) :-<br>belief(Id, adam, get, candy, true). |
| Show error "Bad habits" if Adam wants to eat chocolate and he is fat. | error(Id1, Id2, "Bad habits") :-<br>desire(Id1, adam, eat, chocolate, false),<br>belief(Id2, adam, be, fat, false). |
| Show error "Not at school" if Adam is a student and he is at home from 8 to 18. | error(Id1, Id2, "Not at school") :-<br>type(adam, student),<br>timeof(Id2, 8),<br>timeof(Id2, 18),<br>location(Id2, home),<br>belief(Id2, adam, be, null, false). |
| Show error "Not wearing helmet" if Adam sings in space and he does not wear a helmet. | error(Id1, Id2, "Not wearing helmet") :-<br>location(Id1, space),<br>belief(Id1, adam, sing, null, false),<br>belief(Id2, adam, wear, helmet, true). |

FIG. 9

AUTOMATED STORYBOARDING BASED ON NATURAL LANGUAGE PROCESSING AND 2D/3D PRE-VISUALIZATION

CROSS-REFERENCE TO RELATED APPLICATIONS

The present application claims priority to U.S. Patent Application No. 62/569,097, filed on Oct. 6, 2017, which is incorporated herein by reference in its entirety.

TECHNICAL FIELD

The present disclosure relates generally to storyboard creation, and more particularly, to applying natural language processing (NLP) techniques to scripts in order to extract metadata upon which storyboards may be created. Moreover, the present disclosure relates to two-dimensional (2D)/three-dimensional (3D) pre-visualization of one or more aspects of a script.

DESCRIPTION OF THE RELATED ART

A storyboard can refer to a sequence of images or drawings that describe technical and artistic parameters characterizing a form of media, such as a movie, a performance, and the like. Examples of these parameters can include a type of a shot, the position of a character, motion, camera, lighting, etc. that are used in creating a story on which the media is based. Traditional production teams follow a process whereby a script is developed or written. The script may then be translated into visual representations by storyboard artists. Storyboards can be useful for visualizing a story, the timing of each character's appearance, exit, action(s), etc., and a corresponding environment while still in the early stages of a media project, e.g., TV, live-action movie, animation, theatre, comics, novels, and other forms of media or performances. Storyboard creation is usually an iterative and lengthy process performed by a group of storyboard artists that sketch the visual representations by hand or with the help of digital sketching software.

Regarding the process of script writing, writers are often concerned with maintaining logical consistency throughout a single story or multiple, interrelated stories, such as those upon which movie series or movie worlds are based. For example, a movie and subsequent sequels may have a magical theme or world as a backdrop that follows a set of rules or parameters. To write scripts that are consistent with that magical theme or world, writers must focus on complying with those rules or parameters. Oftentimes, writers become preoccupied with the need to follow such rules or parameters, and lose focus on story development.

BRIEF SUMMARY OF THE DISCLOSURE

In accordance with one embodiment, a computer-implemented method comprises presenting a visual representation of a script based on one or more elements of the script, and presenting a visual representation of an updated script based on one or more updates to the one or more elements of the script. The computer-implemented method further comprises generating a knowledge base comprising information inferred from the script or updated script, and at least one of rules metadata and user queries regarding the script or updated script. Further still, the computer-implemented method comprises generating a visual representation of one or more characters evolution with the script or updated script.

In one embodiment, the computer-implemented method further comprises identifying text of the script and correlating the identified text to one or more of a character, an action, and a location relevant to a scene of the script or the updated script. In one embodiment, the identification of the text of the script comprises parsing the one or more elements of the script to extract single words of the text. In one embodiment, the parsing of the one or more elements of the script to extract the single words of the text comprises applying co-reference resolution to the text.

In one embodiment, the computer-implemented method further comprises building relationships between the one or more elements represented within the script or the updated script.

In one embodiment, the script and the updated script are written in a natural language format. In one embodiment, generating the knowledge base comprises applying natural language processing to the script or the updated script to obtain information regarding each of the one or more elements of the script or the updated script. In one embodiment, the obtained information is stored as basic information elements. In one embodiment, each basic information element comprises an ID, time point information, coordinates information, location information, subject information, relationship information, object information, a relational modifier, a relational object, a relational question, a negation flag, and speaker information if the basic information element represents dialog.

In one embodiment, the computer-implemented method further comprises characterizing the basic information elements as one of a belief fact, a desire fact, a location fact, a confidence fact, a coordinate fact, and a time fact. In one embodiment, the computer-implemented method further comprises comparing at least two of the basic information elements, and determining an existence of a similarity or a contradiction between the at least two of the basic information elements.

In one embodiment, the computer-implemented method further comprises relating the at least two basic information elements in the knowledge base upon a determination of the existence of a similarity or a contradiction.

In one embodiment, the computer-implemented method further comprises calculating a relational factor characterizing a level of relatedness between the at least two basic information elements.

In one embodiment, a separate knowledge base is created for each of the one or more elements of the script.

In accordance with another embodiment, a system comprises a user interface presenting a visual representation of a script written in natural language text based on one or more elements of the script. The system further comprises a visualization engine presenting a visual representation of an updated script based on one or more updates to the one or more elements of the script. Furthermore, an analytics engine and a natural language processor generating a knowledge base comprising information inferred from the script or updated script, and at least one of rules metadata and user queries regarding the script or updated script. Additionally still, the system comprises a visualization engine operatively connected to the analytics engine and the natural language processor generating a visual representation of one or more characters evolution with the script or updated script.

In one embodiment, the analytics engine identifies text of the script.

In one embodiment, the analytics engine identifies the text of the script by extracting metadata from the script, and further correlates the identified text to one or more of a character, an action, and a location relevant to a scene of the script or the updated script.

In one embodiment, the analytics engine is trained using known or most-used words representative of the one or more of the character, the action, and the location relevant to the scene.

In one embodiment, the analytics engine and the natural language processor build relationships between the one or more elements represented within the script or the updated script.

In one embodiment, the system further comprises a script synchronization engine synchronizing two or more iterations of the script, the two or more iterations of the script including at least one the script and the updated script.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5A is an example of a parse request message to an external processing component in accordance with various embodiments.

FIG. 5B is an example of a parse result message in response to the parse request message of FIG. 10A.

FIG. 6A is an example of a parse interaction group request message to an external processing component in accordance with various embodiments.

FIG. 6B is an example of a parse interaction group result message in response to the parse interaction group request message of FIG. 11A.

FIG. 7 is an example implementation of a virtual reality data control interface in accordance with various embodiments.

FIG. 9 is an example of rule and error definition in accordance with various embodiments.

The figures are not exhaustive and do not limit the present disclosure to the precise form disclosed.

DETAILED DESCRIPTION

Various embodiments are directed to a platform or set of tools with which a user may create or edit a script using various visual representations, automatically determine thematic relationships, enforce thematic rules/parameters, as well as create a storyboard. Moreover, the platform can provide a pre-visualization of a story. Users can be directors, scriptwriters, storyboard artists, and/or other users involved in the creative process. In some embodiments, the platform may include various components that alone, or in conjunction with each other provide a script creation or analysis/processing function. Another function is a timeline function that presents a graphical representation of how a character evolves within a story or scene as a function of a script. Another function is a storyboard function that allows a user to generate and/or update a script. Still another function of the platform includes the aforementioned pre-visualization that allows a scene from a script to be viewed by a user in real or near real-time, e.g., a running preview of the script as it is developed using the platform.

Figure 1:
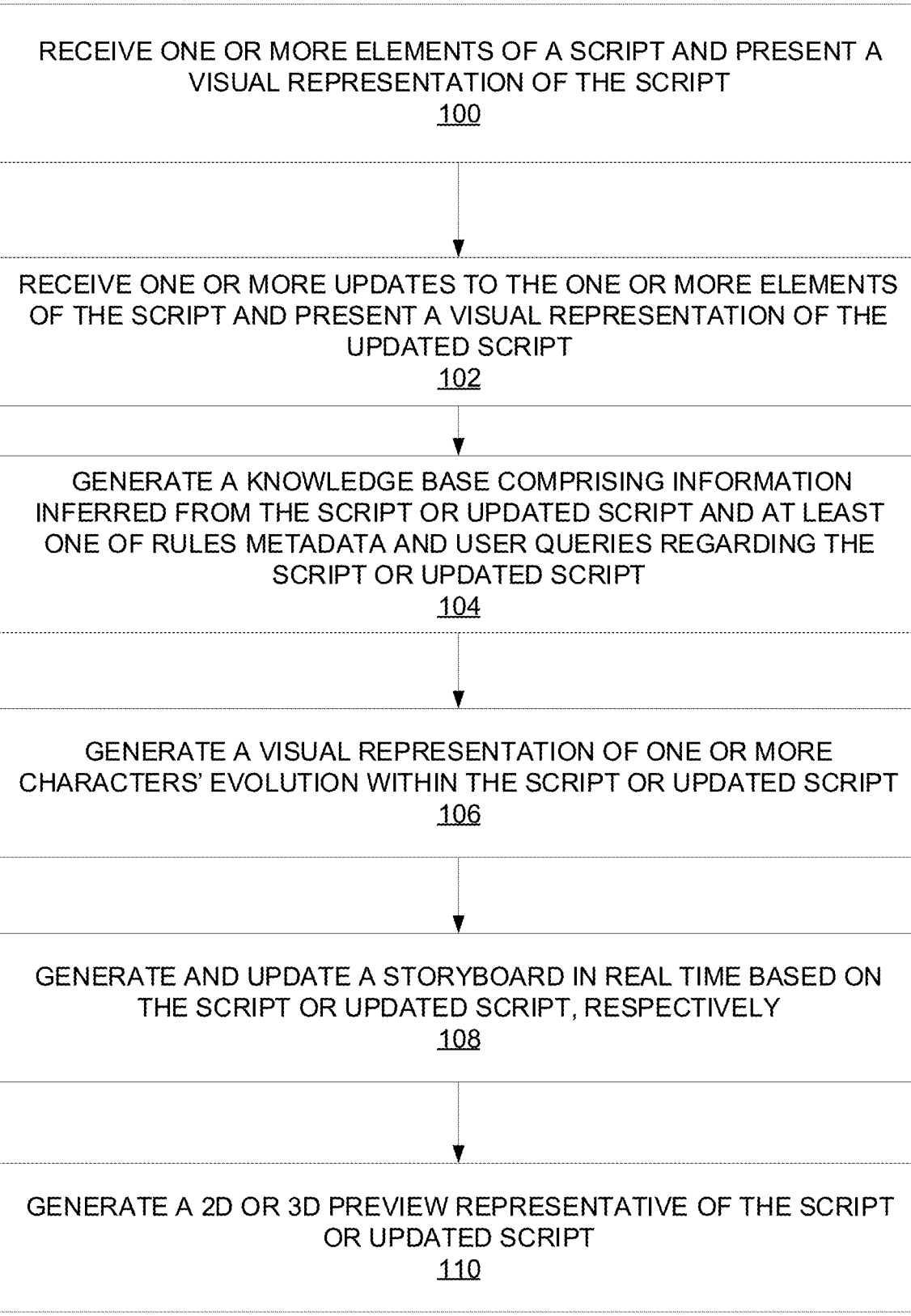
FIG. 1 is a flowchart of example operations that can be performed to provide a script workflow and generate one or more visualizations, such as a 2D visualization, a storyboard, and/or a 3D pre-visualization in accordance with various embodiments.

FIG. 1 is a flowchart of example operations that can be performed to provide a script workflow and generate one or more visualizations, such as a 2D visualization, a storyboard, and/or a 3D pre-visualization in accordance with various embodiments. FIG. 1 may be described in conjunction with FIG. 2 which is a schematic representation of the workflow and visual element generation of FIG. 1. At operation 100, one or more elements of a script are received and a visual representation of the script is presented. A user may enter a script through or using frontend application/UI 202 (FIG. 2) either by typing the script in or by uploading a script into frontend application/UI 202. The script may be in a text format, and can be displayed on editing panel 204. Various embodiments can present or display the script in editing panel 204 in different ways, e.g., a traditional, linear script layout with additional features to assist in script writing.

Frontend analytics engine 206 and/or backend analytics engine 212 may be used to parse the script. Frontend analytics engine 206 and backend analytics engine 212 may be resident on the same device or network, or they may be remotely located from each other. For example, frontend analytics engine 206 may be resident on a user device on which frontend application/UI 202 is implemented, while backend analytics may be implemented on a remotely located backend server 210, and connected to frontend application/UI 202 via one or more networks. The network may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof.

Depending on the complexity of the script, the type of analysis to be performed, and/or the processing power of a device or processor with which the frontend application/UI 202 is implemented, a particular analytics engine may be selected to operate on the script.

For example, frontend analytics engine 306 may be utilized to extract metadata from the script. That is, frontend analytics engine 206 may be programmed with natural language processing functionality such that it can analyze the text of a script and determine the existence of meaningful language, such as language indicative of characters, actions, interactions between characters, dialog, etc. For example, frontend analytics engine 206 may extract metadata indicative of a character, e.g., based on text determined or known to be a name. Frontend analytics engine 206 may extract metadata indicative of an action, e.g., based on text indicative of action, such as verbs. Frontend analytics engine 206 may extract metadata indicative of location, e.g., based on known names of locations (geographical and/or set location) or other textual location information found in the script.

However, backend analytics engine 212 may also be utilized to parse the script. Thus, backend analytics engine 212 may be used as a secondary check on the parsing performed by frontend analytics engine 206. For example, if the script contains large amounts of complex metadata, and backend analytics engine 212 can parse the script faster, backend analytics engine 212 may be utilized for parsing. If the script is in a language recognized only by backend analytics engine 212, again, backend analytics engine 212 may be utilized instead of frontend analytics engine 212. In some embodiments, frontend analytics engine 206 may be utilized to parse a script, while backend analytics engine 212 may be used to perform more intensive "story analytics" by checking for logical consistency vis-à-vis a compiler component 214 of backend analytics engine 212. In some embodiments, parsing can be relegated to an external component or system, such as natural language processing (NLP) core 224 (described in greater detail below), e.g., when processing requirements and/or speed necessitate a dedicated NLP system.

In order to train frontend analytics engine 206 and/or backend analytics engine 212, a logical, formal language can be developed using known words or most-used words to represent or indicate a character, location, action, etc. Using the natural language processing functionality, frontend analytics engine 206 and/or backend analytics engine 212 may discover and/or provide information that can be used by visualization engine 208 to generate a visualization of the script (described in greater detail below).

Referring back to FIG. 1, at operation 102, one or more updates to the one or more elements of the script are received and a visual representation of the updated script is presented. Accordingly, frontend analytics engine 206, backend analytics engine 212, and/or NLP core 224 may perform the aforementioned processing to parse and analyze the updated script or updated elements of the script.

Additionally, using the natural language processing functionality, frontend analytics engine 206, backend analytics engine 212, and/or NLP core 224 may build relationships between the extracted metadata commensurate with the logical, formal language developed in accordance with various embodiments. For example, backend analytics engine 212 may parse a script and determine that two characters A and B are present in a current scene. Based on additional extracted metadata indicative of some action in which characters A and B are engaged, determinations can be made/predicted regarding characters' emotional states, positions, relationships, etc. As alluded to above, various embodiments may compile a script(s) and check for logical inconsistencies. Determinations regarding whether or not logical inconsistencies exist may be determined on this extracted metadata which is used to build a contextual "world." Parsing in accordance with various embodiments can allow a visualization to be realized from a script as well as allow for a compilation to be checked and/or provide VR-related production suggestions.

It should be noted that both frontend/backend analytics engines 206/212 and NLP core 224 may access historical information regarding one or more aspects of the script or known information associated with the metadata in order to further enhance their ability to build the contextual world. For example, one or more persistent data stores (an example of which may be embodied as a persistent data library 220) containing information regarding a character's action and spoken history in previously produced media content that, e.g., the introduction of the character in a currently produced VR experience is contextually consistent. As will be discussed further below, persistent data library 220 may contain further information that can be leveraged in accordance with other embodiments.

It should be noted that backend server 210 may comprise a script synchronization engine 216 and script storage 218, which may be one or more databases or data repositories. Script synchronization engine 216 may operate to synchronize one or more iterations of a script. For example, frontend application/UI 202 may be a web-based or standalone application that can be implemented on one or more devices simultaneously. This allows a user to develop a script using different devices. Script storage 218 may be used to store different iterations or versions of the script from the different devices. Script synchronization engine 216 may access different iterations or versions of a script in progress, compare the different iterations or versions, and update each accordingly so that the user is able to continue development of the script on any of his/her devices.

Referring back to FIG. 1, at operation 104, a knowledge base comprising information inferred from the script or updated script at least one of rules metadata and user queries regarding the script or updated script is generated. In some embodiments (described below), information encapsulated in the script or updated script is represented using knowledge elements. Additionally, character systems (also described below) can be used to thematically connect two or more characters based on the knowledge elements. When two or more characters interact with each other, an interaction group (described below) can be created. The knowledge base may be generated using NLP core 224 (FIG. 2) in accordance with the aforementioned rules metadata.

At operation 106, a visual representation of one or more characters' evolution within the script or updated script is generated. That is, various embodiments may present a visualization of the script entered by a user and parsed by frontend analytics engine 206, backend analytics engine 212, and/or NLP core 224. An example of this timeline is illustrated in FIG. 3E. Compared with the textual representation of a script in FIG. 3A, FIG. 3E uses a timeline format that reflects the evolution of a character throughout the script.

At operation 108, a storyboard reflecting the script or an updated storyboard reflecting the updated script is generated in real-time. At operation 110, a 2D/3D preview representative of the script or updated script is generated for presentation to the user. In operations 108 and 110, some form of abstract or rendered visualization is created to represent a scene or aspect of the script. That is, the script is converted from text to visual elements.

A 2D visualization, such as a 2D top-down view of a scene(s), may be generated using abstract elements representing scene elements, e.g., characters, props, cameras, etc., although other visualizations in frontend application/UI 202 may be used. A user may "run" a script and visually observe the resulting scenes as an abstract 2D representation. The visualization can present different aspects of the script in real-time. For example, as a user is developing or editing a script via editing panel 204, visualization engine 208 may be receiving, from frontend/backend analytics engines 206/212 and/or NLP core 224, information gleaned from the parsed metadata. Visualization engine 208 may use this information to generate the character timeline and/or 2D representation of the relevant aspects of the script. It should be noted that for simplicity's sake, visualization engine 208 may present abstract representations of the script components, e.g., characters, cameras, props, etc. As the user continues developing and/or editing the script, the 2D visualization can reflect the current development(s) and/or edits to the script.

In some embodiments, visualization engine 208 may present a 2D visualization in non-real time, such as if the user wishes to view the visualization of the script as developed/edited thus far. Visualization engine 208 may present a 2D enactment of the script in its current form. It should be noted that script storage 218 may also be used to store different iterations or versions of a script so that visualization engine 208 may access the different iterations or versions for presentation to the user. In this way, the user can see visualizations of the script in different forms or stages during development or editing.

Visualization engine 208 utilizes a visual metaphor language for generating the visualizations. Scene metadata (e.g., characters, props, and actions) may be extracted from the script as described above, and used to generate a first visualization. For example, a library of 3D models may be used, where the 3D models are parameterized in terms of visual appearance, or other parameters. This parametric representation may be referred to as a "smart object." Moreover, one or more catalogs of different kinds of interactions which may be possible between any two pairs of objects, which are referred to as "affordances" may be utilized. Metadata obtained from a script, for example, may be mapped to one or more instances of smart objects and corresponding affordances that are being invoked between them. In this way, one or more elements of a VR environment can be transformed from scene metadata to an actual visual representation.

Each character in the script (if present in a currently-presented scene) has a position in the visualization. The same holds true for props, and if necessary, equipment such as lights and/or cameras. The position of these scene elements can change over time. When users "run" the script, the visualization may dynamically update to show the movement of elements across, e.g., checkpoints creating an aforementioned 2D top-down preview. Checkpoints can refer to a reference time point. The preview can be viewed in real-time, slowed down, and/or sped up as desired. A preliminary timing check can be used. However, the timing of events in virtual space can be markedly different from that on 2D storyboards because, as described above, different characters, props, interactions, actions, etc., can be present/occurring in the 360 degree space of a VR environment. Accordingly, one or more of frontend/backend analytics engine 206/212 and NLP core 224 may adjust any event timing or timing checks for consistency among different aspects of a scene.

In some embodiments, a "heating map" may be generated. A heating map can refer to a visual representation of a script element's relationship to another script element. For example, a heating map can be used to represent how close a character is to a camera or another character. Information gleaned from such a heating map can provide direction to a user regarding the use of "call to action" hints. A call to action hint can refer to some cue directed to the audience that draws their attention to a particular part of the scene, e.g., a subtle increase in lighting that directs the audience's attention to some action or character or other element in that part of the scene. Other calls to action may include, but are not limited to the use of louder audio that directs the audience to the source of that audio. In some instances, heating map information can be used to inform the user or scriptwriter of an aspect of the scene that should be addressed by inserting dialog or having one or more characters engage in some action, etc.

As the user develops or edits the script and/or adjusts one or more aspects of the visualization, visualization engine 208 reflects the appropriate changes relative to the first visualization. It should be noted that changes can be effectuated by the user interacting with the script through editing panel 204. Additionally, the user may alter one or more aspects of a scene using the visualization itself as it is presented as part of the frontend application/UI 202 which is interactive. For example, the first visualization may reflect a current state of the script as set forth in editing panel 204. The user can then adjust the placement of objects, props, characters, as well the speed of the movement of those objects, props, and/or characters by interacting with the first visualization. Thus, visualization engine 208 can generate a visualization based upon information or input from editing panel 204, where editing panel 204 may include a section for script editing, as well as a section for presenting and/or editing the visualization.

If the user wishes to add an object that was not identified during parsing of the script, it can be added manually (again through the visualization section of editing panel 204), after which frontend/backend analytics engines 206/212 and/or NLP core 224 will track all references to that object going forward. In some embodiments, frontend/backend analytics engines 206/212 and/or NLP core 224 can update the script in editing panel 204 to reflect any objects, characters, etc. added through a visualization and/or not identified during the metadata parsing stage. In some embodiments, a separate visualization panel or section separate from editing panel 204 may be used for presenting the visualization to the user (not shown).

In some embodiments, persistant data library 220 may contain images of outfits associated with one or more characters, sketches (image and video), or any other relevant information or data that can be used to create and/or edit aspects of the script or visualization.

Generation of the storyboard can performed by visualization engine 208 as well. The process for generating the storyboard is similar to generation of the 2D visualization described above. However, the characters, props, and other elements parsed from the script and associated with visual elements are reflected in a sequence of still images. The storyboard may be presented on editing/visualization panel 204. The storyboard may be printed or exported in different formats, e.g., JPEG, PNG, TIFF, PDF, etc.

Figure 2:
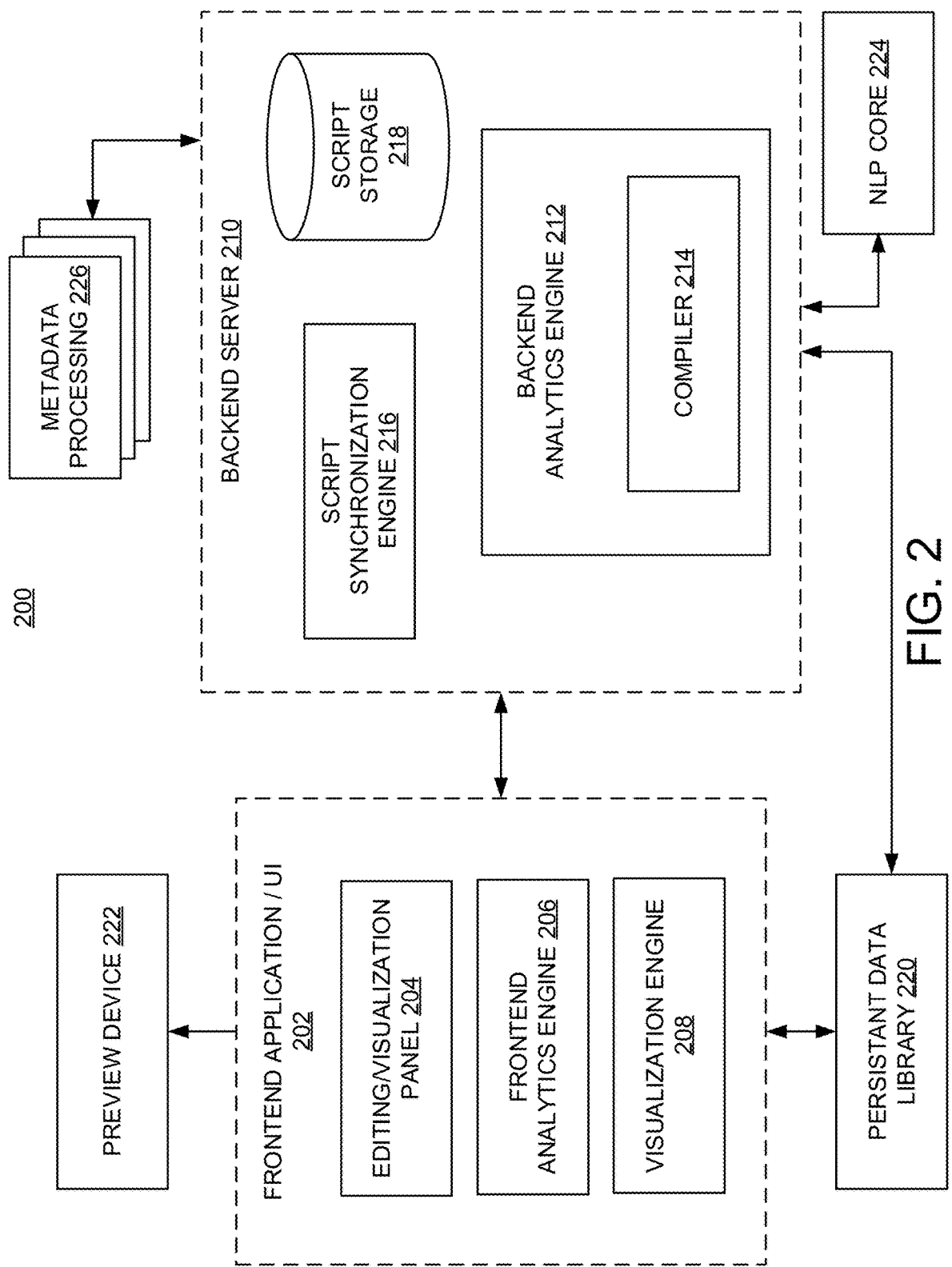
FIG. 2 is a schematic representation of a system architecture in which the workflow and visual generation operations of FIG. 1 may be implemented.

Again, similar to the 2D visualization and storyboard generation, the script or updated script may be used to generate a 3D representation of cameras, locations, objects, etc. present in a scene of a script. That is, the 3D preview may be presented using the abstract representations utilized in the 2D visualization. The 3D preview may be used to assess the script or story in terms of contextual and/or thematic cohesiveness, consistency, aesthetic appeal, etc. For example, a writer may present the 3D preview to a potential producer, or a director may present the 3D preview to one or more actors. The director may view the 3D preview in advance of an actual rehearsal in terms of a live action movie, or prior to animating characters, scene elements, etc. for an animated production. In some embodiments, the 3D preview may be presented to the user instead of the 2D top-down visualization during script development/editing. In some embodiments, a 3D preview can be output to an augmented reality (AR) or VR-rendering application/device. For example, the 3D preview may be presented to a user through preview device 222 (FIG. 2). As discussed above, preview device 222 may be an HMD, a see-through display, a video see-through display, a laptop computer, a smartphone, a tablet, a mobile device, a projector, a monitor, a TV, and/or other displays.

It should be noted that in some embodiments, the visualization can be used as a basis for creating an actual VR experience based on the script or story. That is, a user may associate the abstract representations of objects, props, characters, etc. with fully-realized digital representations, backgrounds can be added, etc. such that the visualization can be translated into actual media content. Technologies such as photogrammetry may be utilized to translate 2D content into 3D models/content for use in the VR experience.

It should be noted that a compiler 214 of backend analytics engine 312 can be used to analyze a script for consistency and provide recommendations for addressing any inconsistencies. That is, a text script, e.g. one entered into or uploaded via frontend application/UI 202, can be analyzed for structural and/or contextual validity. That is, a script may be analyzed for any logical inconsistencies. The script may be analyzed from a "linear" or traditional 2D experience perspective as well as from a virtual reality (VR) experience perspective.

For example, compiler 214 may receive information regarding the metadata extracted from the script as well as any information or data derived therefrom from frontend/backend analytics engine 206/212 and/or NLP core 224. Compiler 214 may utilize this information to check a current iteration or version of the script for structural validity. For example, compiler 214 can determine whether or not any structural errors are present. A structural error can refer to errors associated with "physical" representations, e.g., errors in camera placement, prop placement, and the like, that are not physically realizable in a scene. An example of a structural error can be a scenario where a camera "goes through" a prop—this is not possible, and should be identified. Compiler 214 may also determine whether or not any contextual errors are present. A contextual error can refer to story-based inconsistencies, e.g., the user has a particular character speaking in a scene, where that character has not yet made an entrance in that scene, or the character was killed off in a previous scene.

Compiler 214 may generate one or more notifications regarding the error. The one or more notifications may simply be notifications that inform the user that an inconsistency exists, as well as where, and/or what aspect(s) or element(s) of the script is involved. In some embodiments, the one or more notifications may be recommendations to the user regarding solutions to rectify the inconsistency. For example, backend analytics engine 212 may, from the parsed metadata, determine that an interaction exists between two or more characters in a particular portion of a scene. Compiler 214 may analyze this information and determine that a call to action cue should be provided to the audience based upon this existing interaction. Accordingly, compiler 214 generates a notification suggesting that the user insert a call to action cue, such as a lighting change or audio cue to direct the audience to that interaction.

As alluded to above, the disclosed platform provides the ability to create and edit scripts, the ability to represent character evolution using a visual timeline, the ability to generate storyboards, as well as the ability to generate pre-visualizations, whether 2D or 3D. Examples of these functions are described and illustrated in FIGS. 3A-3L.

Figure 3A:
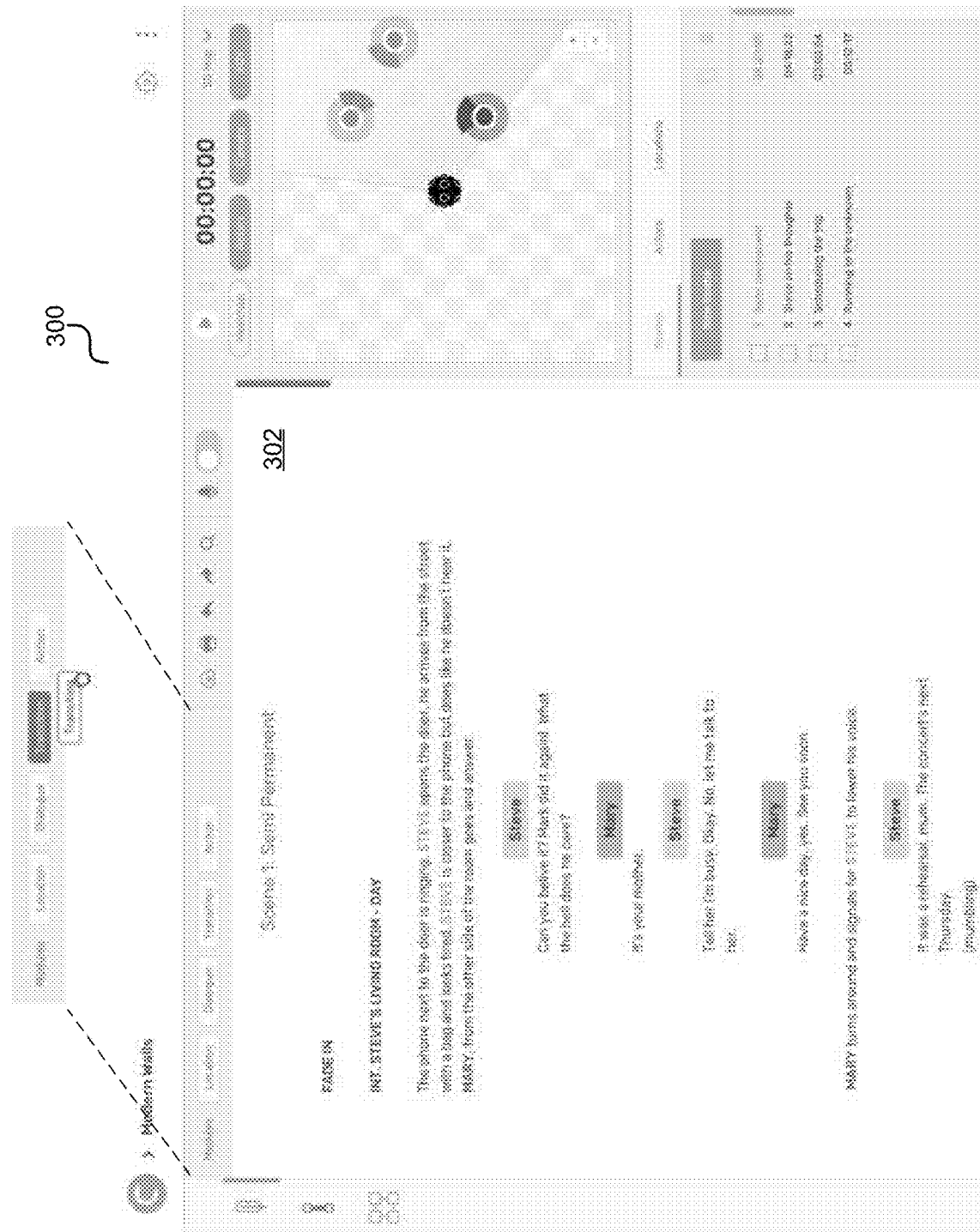
FIGS. 3A-3L illustrate example functionality provided by a user interface of a platform adapted to perform the workflow and visual generation operations of FIG. 1.

FIG. 3A illustrates a script layout view with additional features presented in the UI to assist in writing a narrative story in natural English language. An example UI 300, which may be an embodiment of frontend application/UI 202, includes editing panel 302. Editing panel 302, which may be an embodiment of editing/visualization panel 204 of frontend application/UI 202, is used to present a textual representation of a script. A user can add, edit, delete, and/or view the script.

A script may include a series of scenes. Each scene can be thought of as containing elements referred to herein as "modules." Modules may describe each sentence of the script (1 module=1 sentence, irrelevant with respect to its written content). A module may be thought of as an "atomic" portion of a story. Examples of modules may be any of the following: location, dialog, transition, or action. A user can describe the module in a sentence, add or drag it into the script or existing modules. FIG. 3A illustrates representations of these modules. When a user wishes to introduce a module into the script, the user may select a desired module and drag it to a desired point in the script on editing panel 302.

Figure 3B:
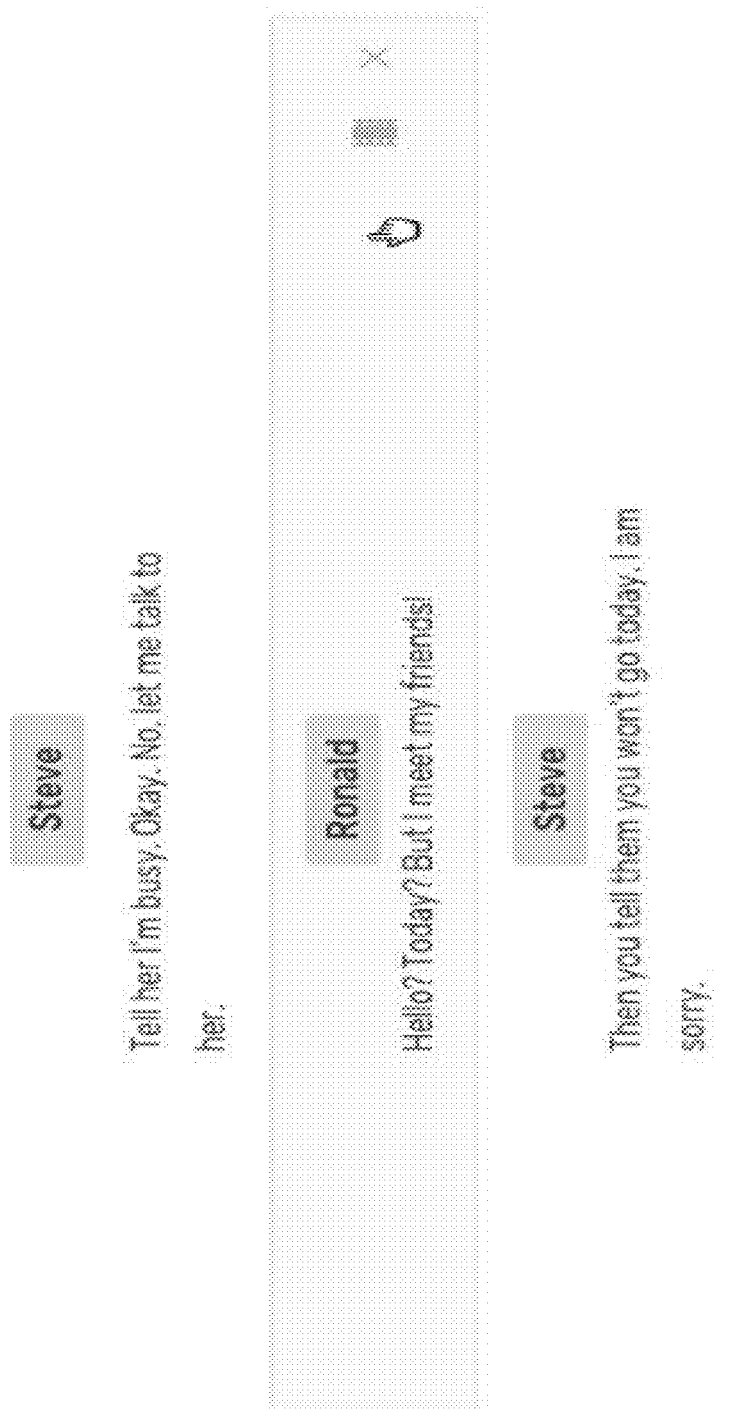

A location module sets a new environment of the story. A dialog module sets a spoken conversation of a character. A transition module sets a period of changing from one state to the other, normally used at the beginning and the end of each scene. An action module sets an expressive action taken by the characters of the scene. FIG. 3B illustrates an example of a user hovering on an action module placed into the script. Because the module is an action module, an option to view the action can be presented to the user vis-à-vis a selectable "film" icon.

Location, dialog and action modules are provided with the option of choosing a camera shot. A context menu will open upon selecting a camera shot icon and will give a list of options for each module. For example, FIG. 3B illustrates an example of a user hovering on an action module placed into the script. Because the module is an action module, an option to view the action can be presented to the user vis-à-vis the selectable "camera shot" icon.

By default, the platform can recommend the most appropriate and common shot for the given module. Although it is an automated process, users have the option to manually edit the selected camera shot by choosing another one from the list. The list may include options for common type of shots, common angle shots and common camera movements. In the event a user is not satisfied with the given list, an additional option to create a new camera shot is provided at the end of the list. This option allows users to create and assign a name to their own personalized camera shot.

Figure 3C:
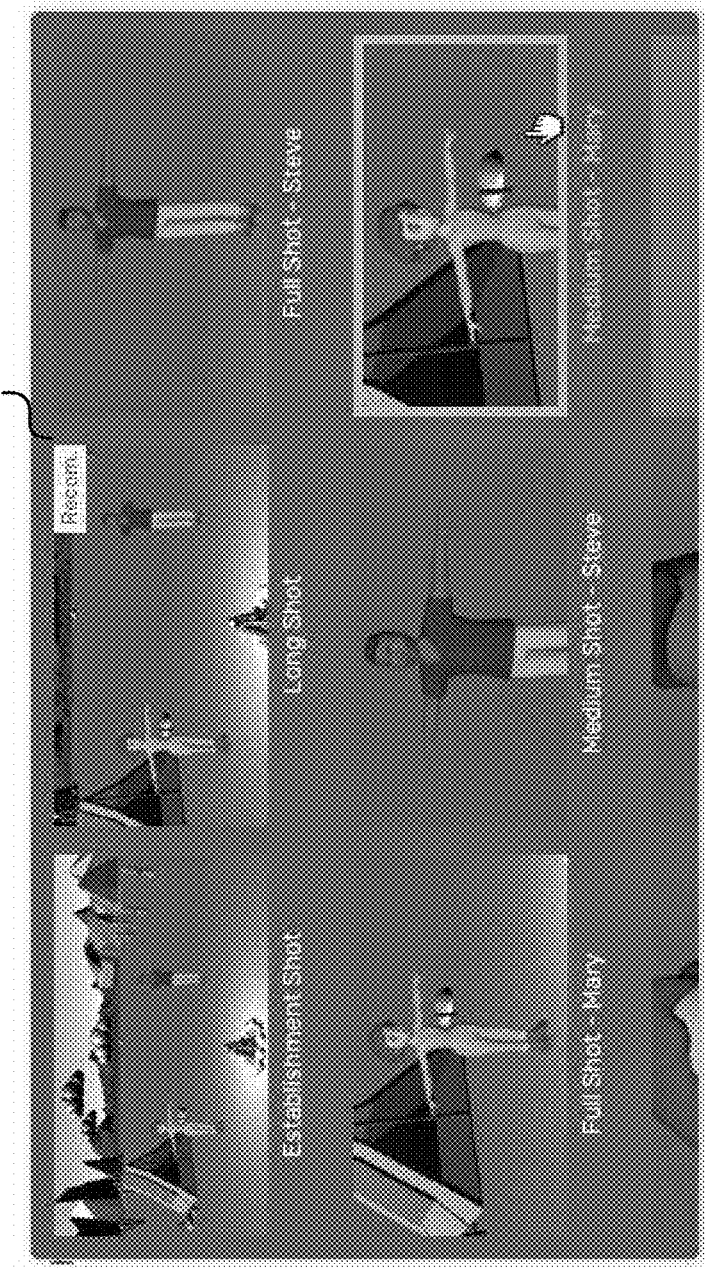

Each module, and therefore each camera shot, will create a frame for a storyboard that can be generated. An example of the camera shot list 304 is illustrated in FIG. 3C. As illustrated, the camera shot list 304 includes a variety of different camera shot images generated for the user. As noted above, a particular camera shot option in the camera shot list 304 can be identified (e.g., as being recommended) or is selected by default), in this case the "long shot." However, the user may select another camera shot from the list, in this case a "medium shot" of the character "Mary." It should be noted that in some embodiments, the camera shot may be considered to be a module itself, and a camera shot module option may be provided to the user.

In some embodiments, the user can record a soundtrack with their (or another's) voice over any dialog text as voice clips. Soundtracks associated with the dialog will be automatically animated in a 3D visualization. Characters assigned to the voice clips will be animated with lip sync technology so that the character preview (e.g., 3D pre-visualization) accurately mirrors the speech in the dialog.

Figure 3D:
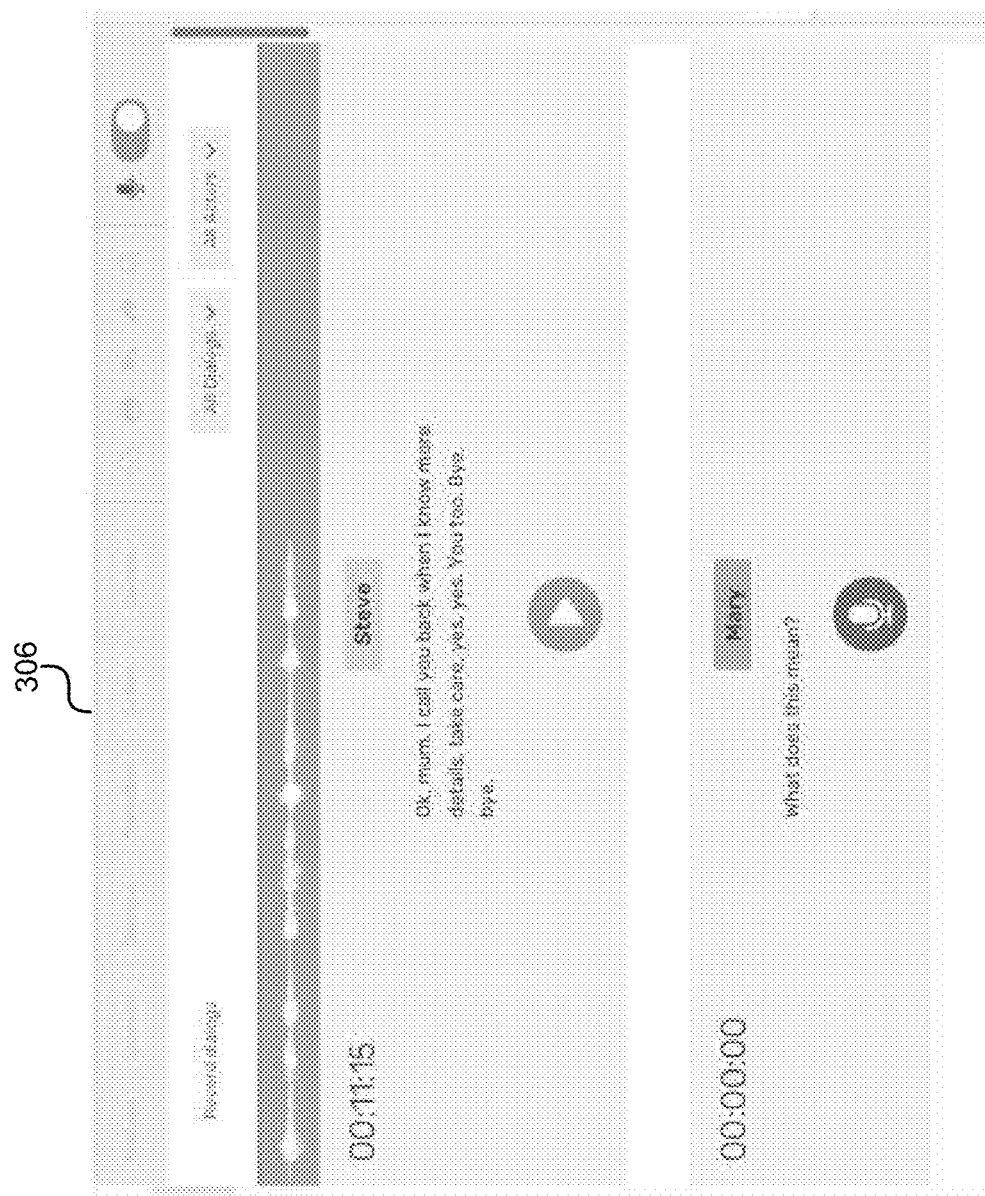
Figure 3E:
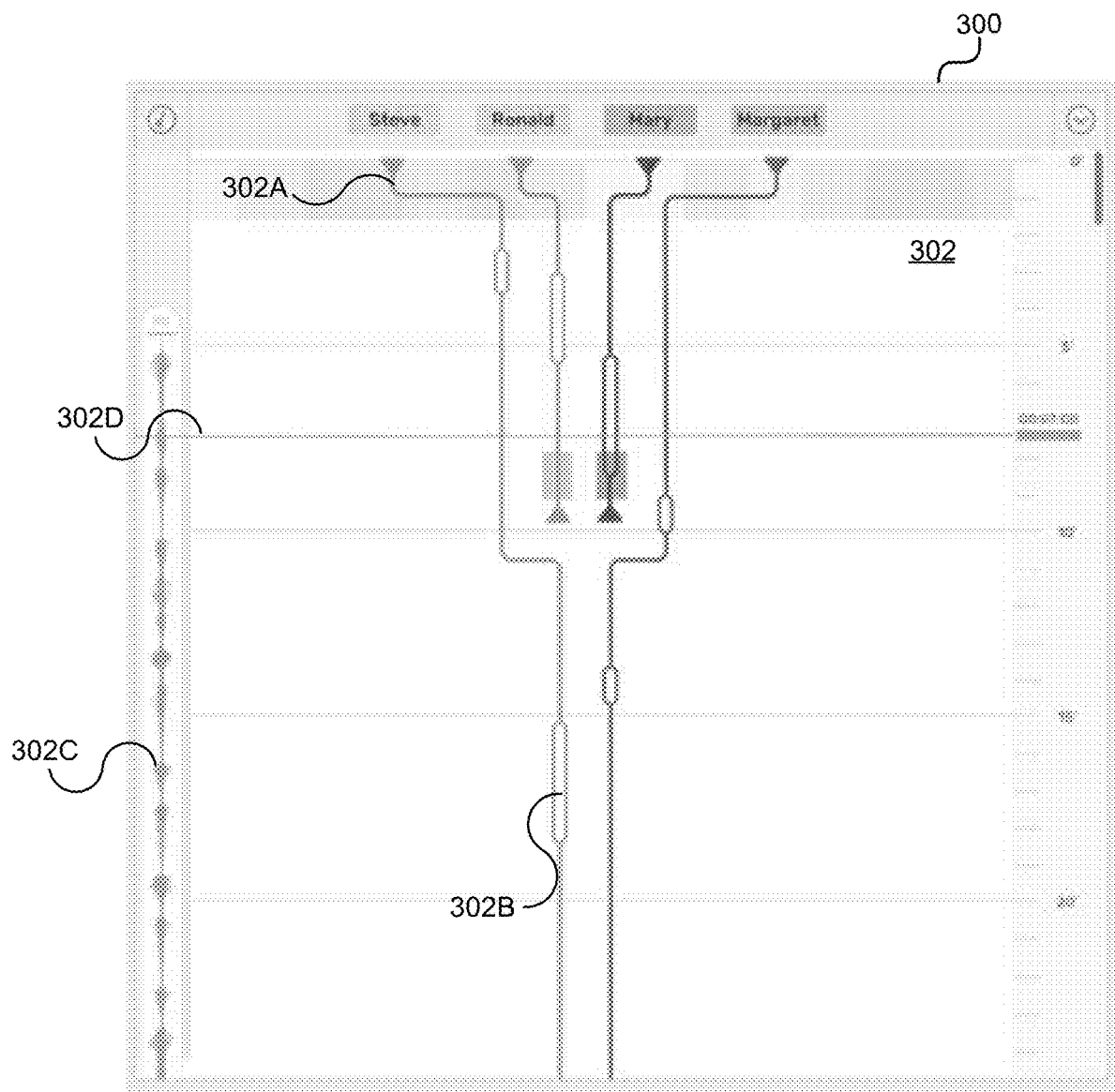

FIG. 3D illustrates an example of a record dialog interface 306. As illustrated, a user may select an option to record spoken dialog of the script text, e.g., Mary's dialog "What does this mean." After recording, the user may play back the spoken dialog, e.g., Steve's dialog "Ok, mum. I will can you back . . . ." Time durations associated with the spoken dialog can be determined and presented to the user. Visual representations of the spoken dialog, such as a simulated oscilloscope, can also be presented. The user may wish to ascertain volume levels and/or timing associated with the spoken dialog.

As noted above, the script can be uploaded to the platform. That is, a script in a platform-specific format or other third-party format can be uploaded. In some embodiments, the platform may perform a conversion from a non-native platform format to the native platform format. Additionally, a script can be exported in another formation, e.g., pdf, rtf, txt, etc.

A noted above, a timeline view can be used to illustrate the evolution of each character in a scene as a graphical 2D representation of the script. An example of this timeline view is illustrated in FIG. 3E. The timeline view can be presented in editing panel 302. That is, a user may switch between a textual script representation view and a timeline view. The X-axis represents the different characters and the Y-axis represents time. In order to be fully distinguishable each character may be assigned its own color. The representation of any interactions between characters (interaction view) is created automatically from the parsed script. The script can be represented in a character-centric perspective from top to bottom. This differs from other timelines in the prior art that are normally presented horizontally. In this way, a user can switch between the textual script view (also vertically presented) and timeline views and have the position of each module (one after the other) or elements (ordered in time) as a reference, available in both views. In some embodiments, the timeline view can be presented along with/in conjunction with the textual script view (also vertically presented) so that both that be analyzed/referenced during script creation or editing. It should be understood that the timeline view can be generated automatically. However, the user may still edit the script from a time perspective.

There are lines and controls for each character, camera, and smart object in a scrollable container. Additionally, environment sound files can be placed here as well. By hovering over modules users can get information, add new actions, interactions and dialogs, add new characters and smart objects, etc. Elements on the lines represent the dialogs and action modules, and can also be dragged into different positions and overlapping positions (when various actions or dialogs or an action and a dialog are happening at the same time). Every change made in the timeline affects the textual script view. For instance, if a user decides to position an element in another position on time (i.e., positions a dialog after an action), the same change will be reflected in the script view and the modules will adjust accordingly to the new time.

FIG. 3E illustrates an example of a timeline view in accordance with various embodiments. A timeline may include one or more character timelines, an example of which is character timeline 302A. "Bubble" 302B may represent dialog to be spoken by a character in the particular scene represented in editing panel 302. The user may have entered this dialog, or it may have already been present, and the user is checking to see what dialog is associated with a particular character at a particular point in time in the scene. Element 302C presents background audio to a user.

It should be understood that the user may manipulate one or more aspects of UI 300, e.g., the character timelines, by selecting and, e.g., dragging a character timeline in accordance with the user's desired effect. For example, when character timelines are brought together or near each other, it is indicative of the represented characters engaging either other through scripted dialog or action(s). Different representations indicating the presence or exit of a character in or from a scene can be presented. For example, a solid timeline can indicate the presence of a character, whereas a dotted timeline can indicate that the character has left the scene.

A timeline controller or pointer 302D may be used by the user to "scroll" through a script/timeline in editing panel 302. The timeline controller 302D may be associated with a time depending on where it is presently positioned.

Transitions are represented in the timeline view as a horizontal block 302E, affecting all the elements in the scene during this time. When users don't define a transition, by default, the transition will be a cut. If defined a specific transition, the transition will happen between modules. The time duration of a transition can also be extended or reduced.

Situations in which the timelines of all characters come together can be referred to as macro interactions. All characters/objects have the same interaction, sharing either position in space or conversation (dialog). Macro interactions are distinguishable from group interactions, where there are characters in different positions or having separate conversations. The timelines can be divided into different identifiable zones to differentiate interactions from each group. An example of a group interaction is that delineated by zone 302F, which represents some interaction(s) between the characters Steve and Evan. Another "group" may include the character Margaret.

Figure 3F:
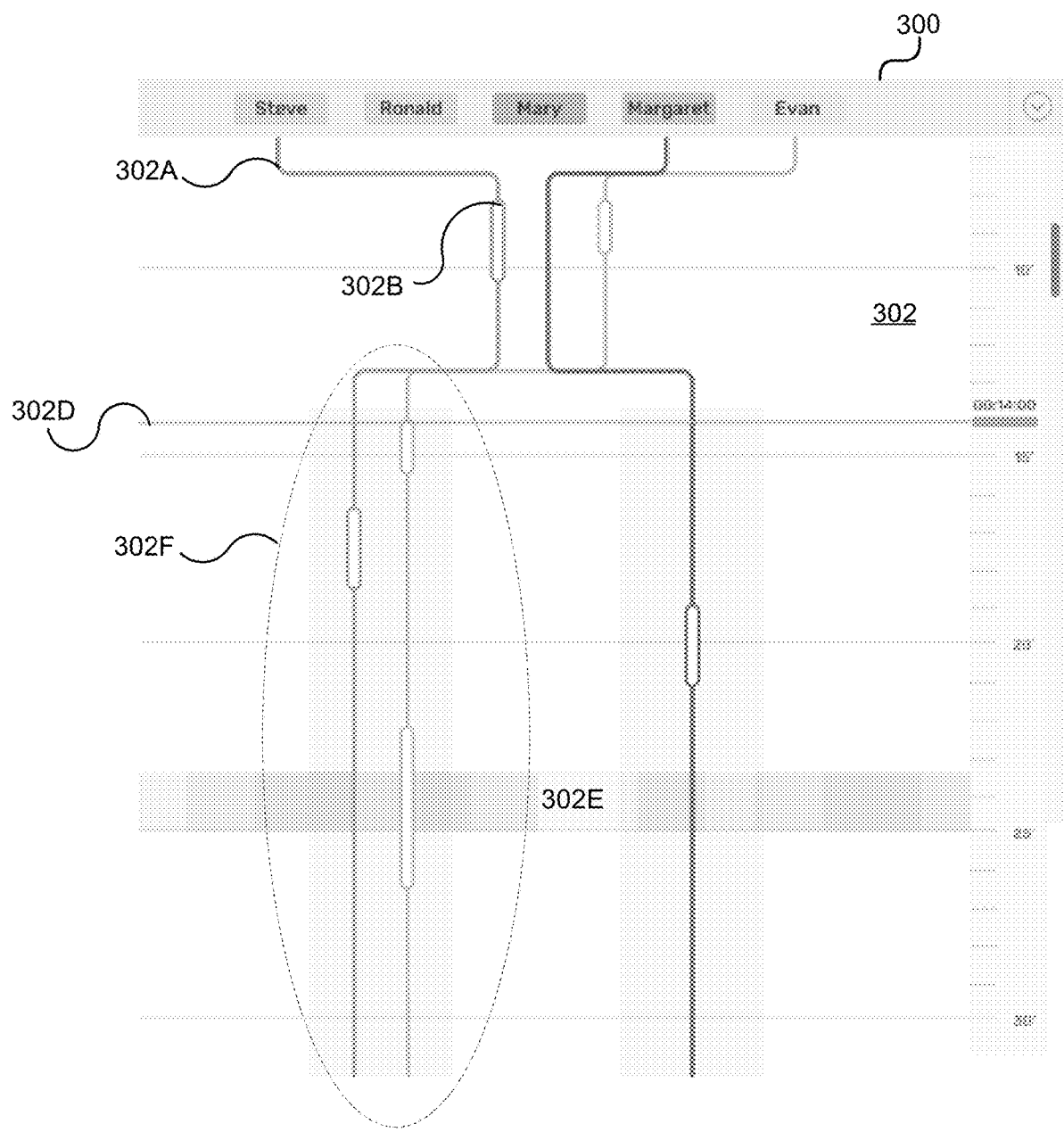
Figure 3G:
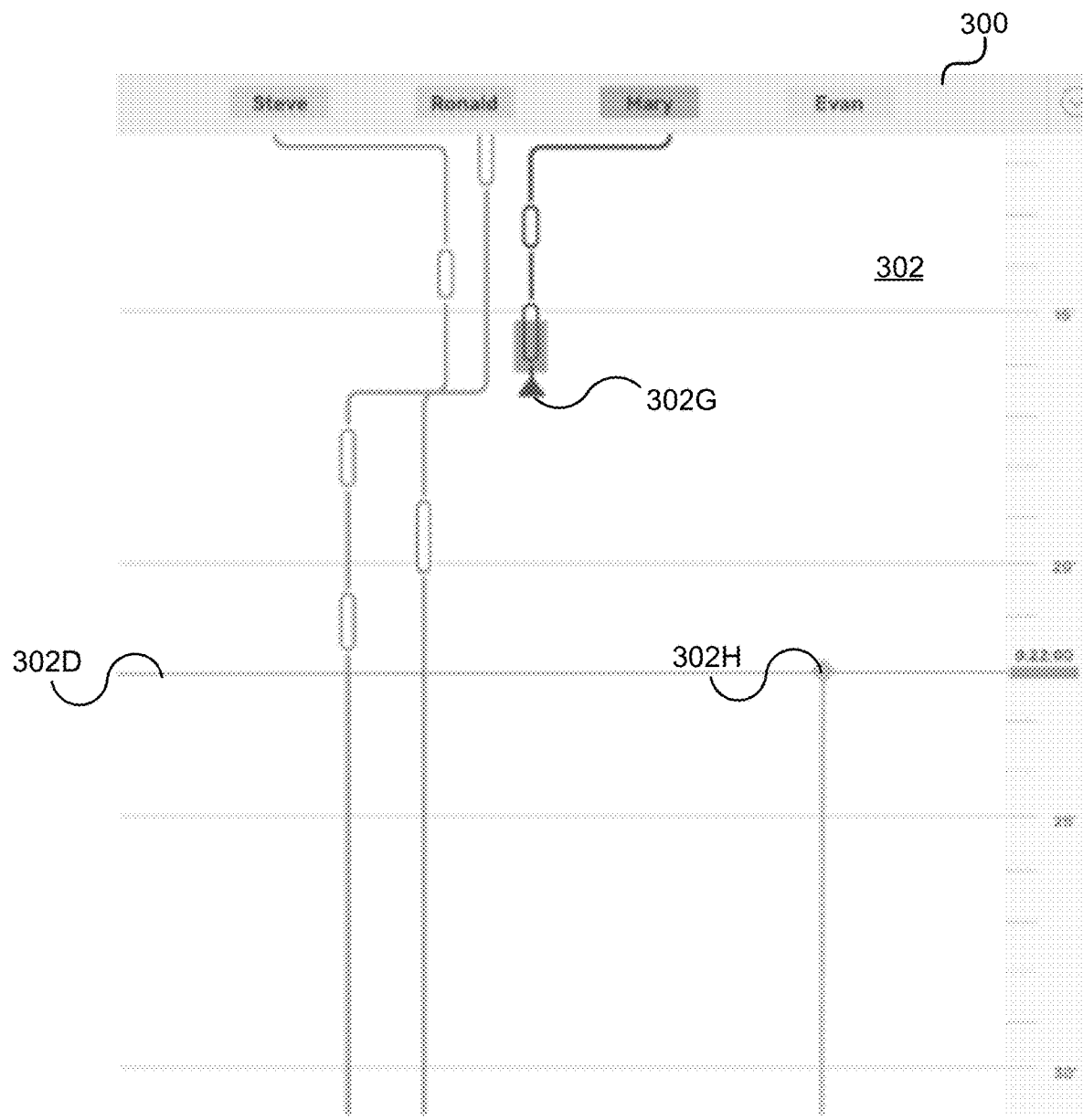

It should be understood that a character can be in a particular scene from its starting point or may enter at any point. Likewise, a character may leave a scene at the end of the scene or any time prior to the end of the scene. FIG. 3G illustrates a scene represented in a timeline visualization in editing panel 302. As illustrated in FIG. 3G, the character, Mary, appears in the scene from the beginning, but leaves at point 302G during the scene. On the other hand, character, Evan, who does not appear at the beginning of the scene enters at point 302H partway through the scene.

Figure 3H:
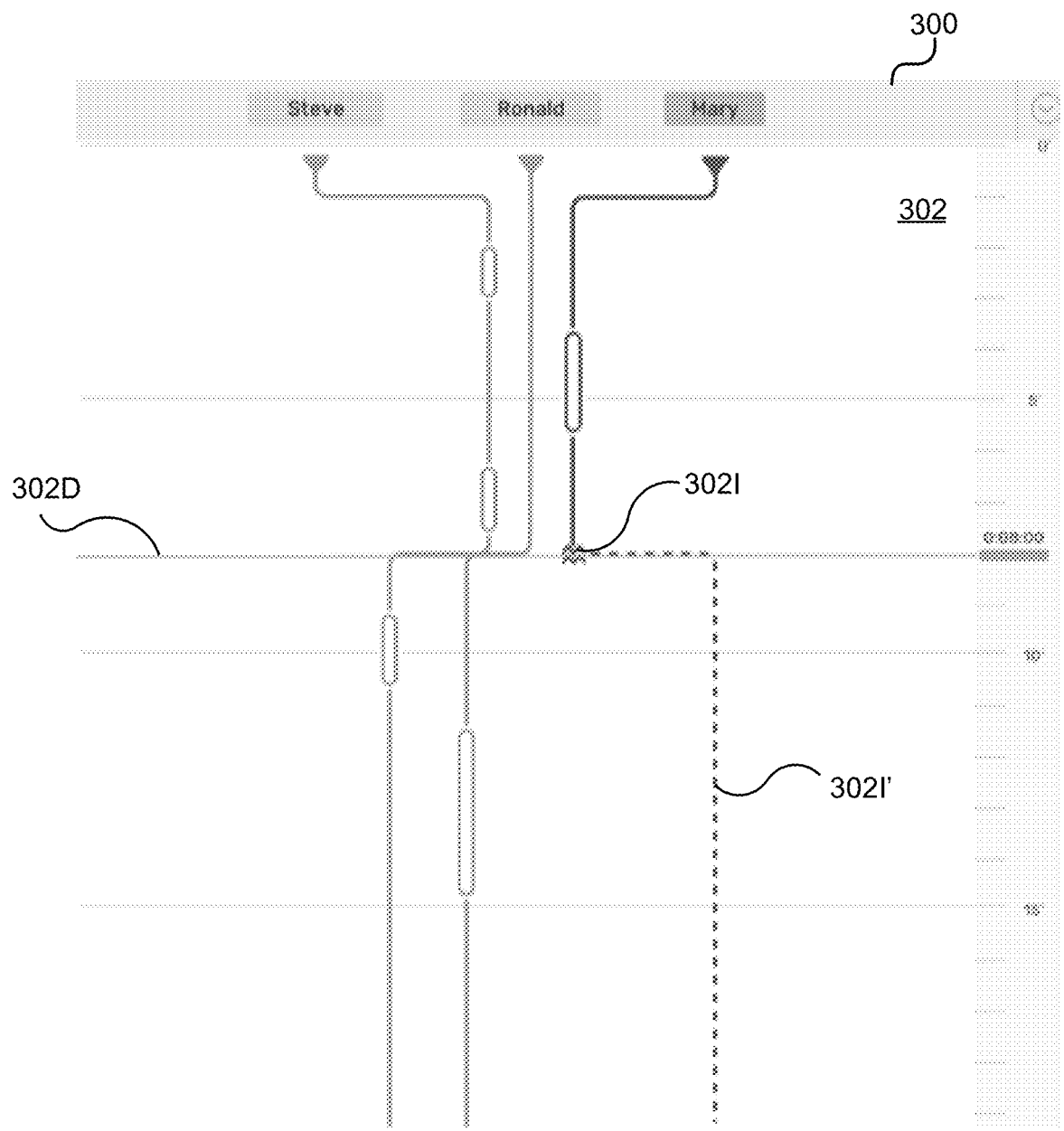

An idle mode may be used to describe the state of a character when it is in a scene but not acting or when not engaged in any interactions. For example, it may be that a director wants to include a character in a scene, but only in a "passive" capacity. FIG. 3H illustrates an example of such an idle mode, where the character, Mary, is in the scene, but not engaged in any interactions or acting. A modified representation of Mary's timeline, in this case, an indication 302I (at the 8 second mark) of her idle status, and a hash line 302I' used to represent her timeline during the idle mode, can be used.

Figure 3I:
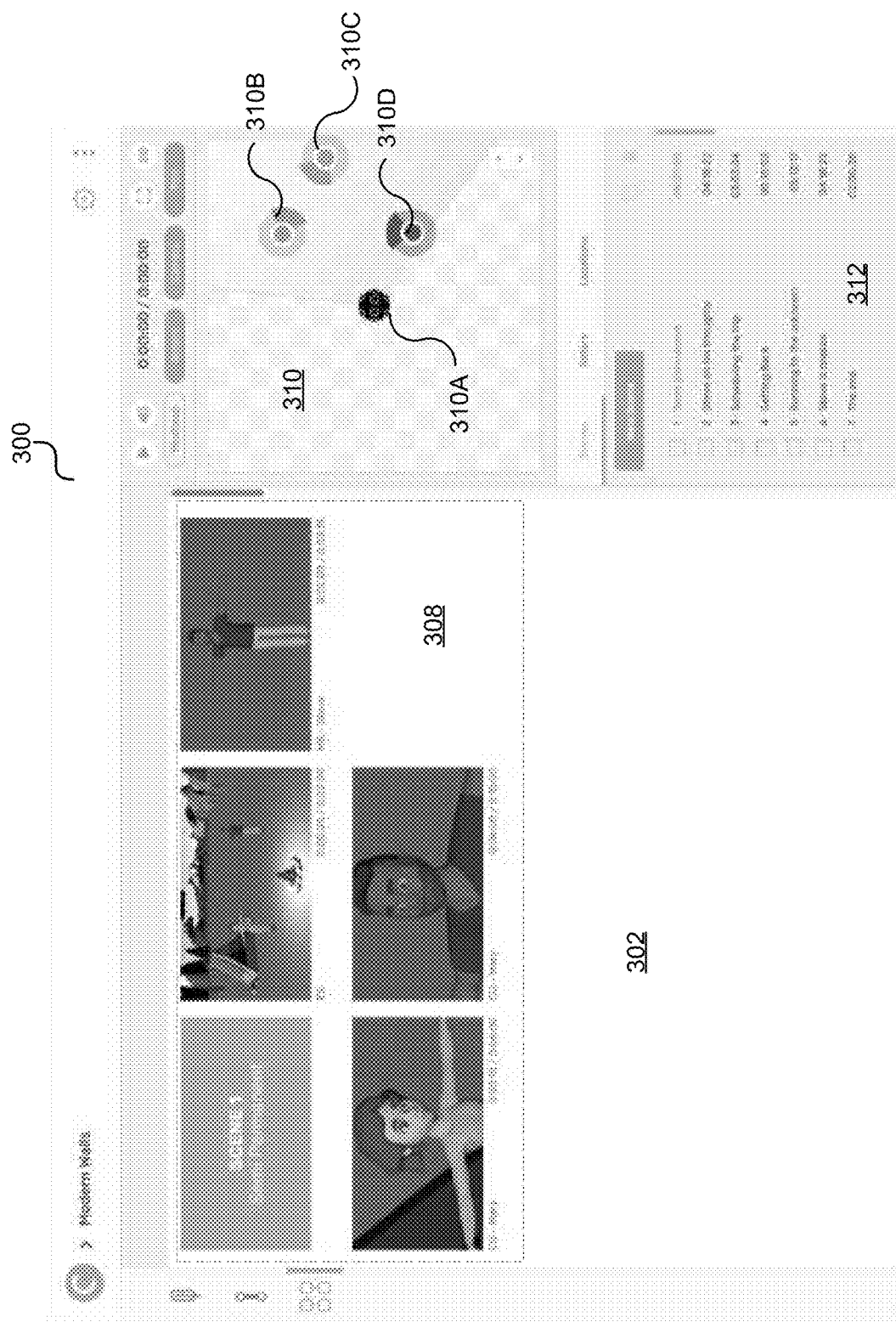

As described above, a storyboard view may be another output generated based on the script. FIG. 3I illustrates an example of such a storyboard 308. Storyboard 308 may comprise a series of images composed in frames. Each frame can represent a module from the script. Referring back to FIG. 3C, the series of images in storyboard 308 may be made up of images selected by the user during camera shot selection (or automatically selected/by default for that scene).

FIG. 3I also illustrates a 2D visualization 310. A camera 310A, characters Mary and Steve represented as elements 310B and 310D, as well as a representation of a tent 310C is presented in the 2D visualization 310. As previously discussed, visualization engine 208 (FIG. 2) may be used to generate visualizations, including 2D visualizations and storyboards. Validation engine 208 may select different visual or graphical representations and/or visual orientations depending on the type of visualization to be generated. That is, the 2D visualization 310 presents abstract elements representative of characters or objects, such as orbs/circles, while storyboard 308 relies on actual images to represent characters and objects. It should be understood that the user may have chosen to associate a particular image with a particular character. The user may access a data store of images that can be used. Options can be provided to hide/show characters (actors) in a current scene, hide/show the camera(s) in the current scene, and adjust field of view (FOV) that represents a portion(s) of the scene that a camera can observe, so that users can plan the positioning of elements.

Also illustrated in FIG. 3I is a UI control panel 312 that can be utilized by the user to switch between controlling different aspects of the script or various visualizations, e.g., timeline view, storyboard, 2D visualization, and 3D visualization. UI control panel 312 may also present relevant information associated with those different aspects, such as times or frames commensurate with an action or dialog involving a character. As noted previously, a timeline controller 302D (FIG. 3A) may be used to walk through a script or timeline view. UI control panel 312 may reflect relevant aspects of a current script, timeline, storyboard, or 2D/3D visualization, and can update depending on where in a script, timeline, etc., the user chooses to view.

Figure 3J:
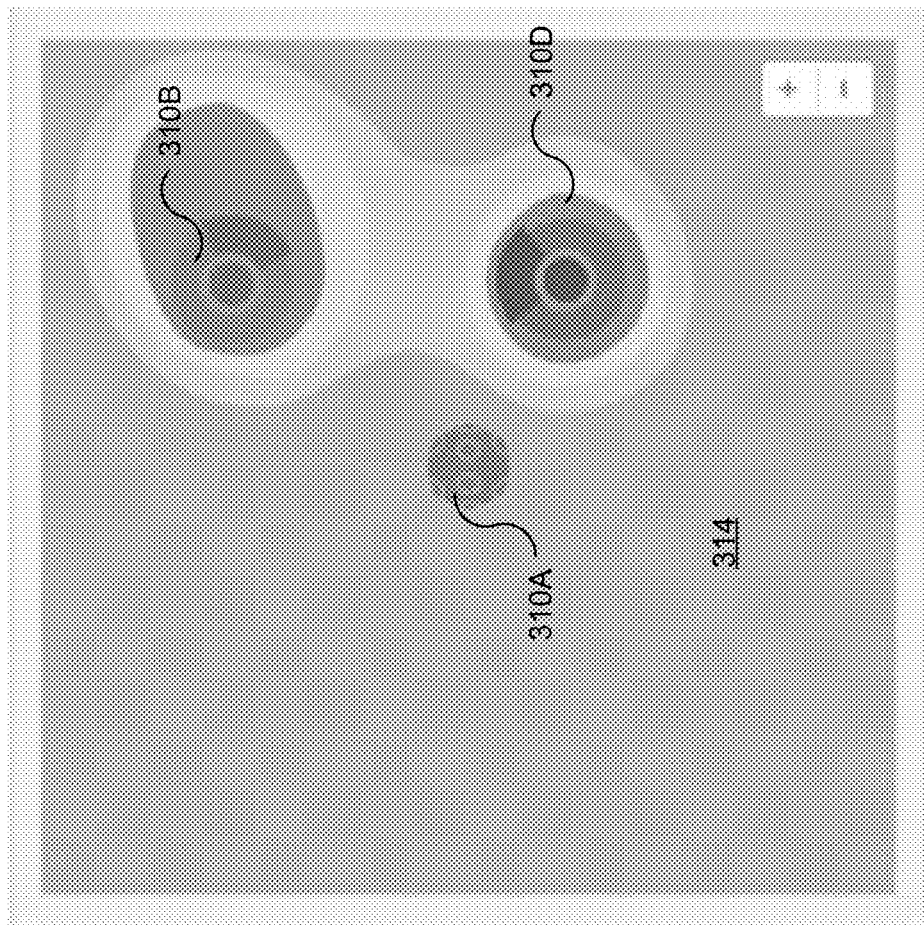

FIG. 3J illustrates an example of the heating map functionality described above. A heating map 314 can be generated in conjunction with the 2D visualization 310 (or in a 3D visualization). In this example, color can be used to indicate the closeness of two or more aspects or elements of the scene, however, other methods of indicating closeness can be utilized. In this example, the heating map indicates a relationship between characters 310B and 310D that should be addressed by the user with, e.g., a call to action. In some embodiments, colors in the yellow, orange, and red spectrums can suggest levels or grades of closeness, whereas colors in the blue or green spectrums suggest a lack of closeness. It should be understood that the heating map can reflect any type of relevant information besides just closeness. For example, action or movement, as well as sound can be reflected in a heating map, where different colors can be used to represent gradations or levels of reflecting the intensity or amount of action, movement, sound, whether a character/object is present, etc. In some embodiments, colors of the heating map can be used to indicate how much information can be consumed by a viewer at a given camera position in the scene.

Figure 3K:
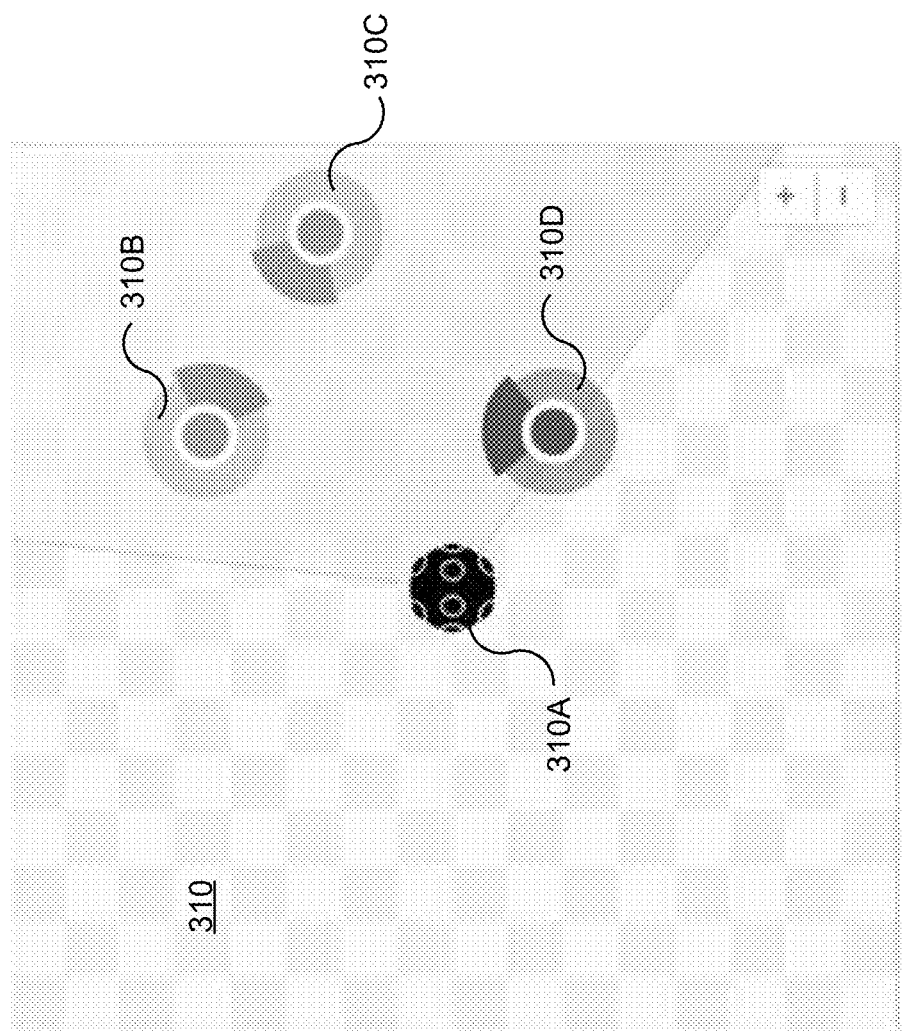

FIG. 3K illustrates an enhanced view of example 2D visualization 310. It should be appreciated that darker portions of each element (character/object) can represent orientation or point of view of the element. For example, character 310B is represented as, e.g., "looking" to the right, while character 310D is represented as looking up towards character 310B. Element 310C, which as described above, may be a tent can be represented as having its opening/door positioned in the direction where character 310B is positioned in the scene. This view provides an abstract, minimalistic preview of the story a user authors and hides all detail unnecessary to understanding the spatial relationships between characters or other elements.

Figure 3L:
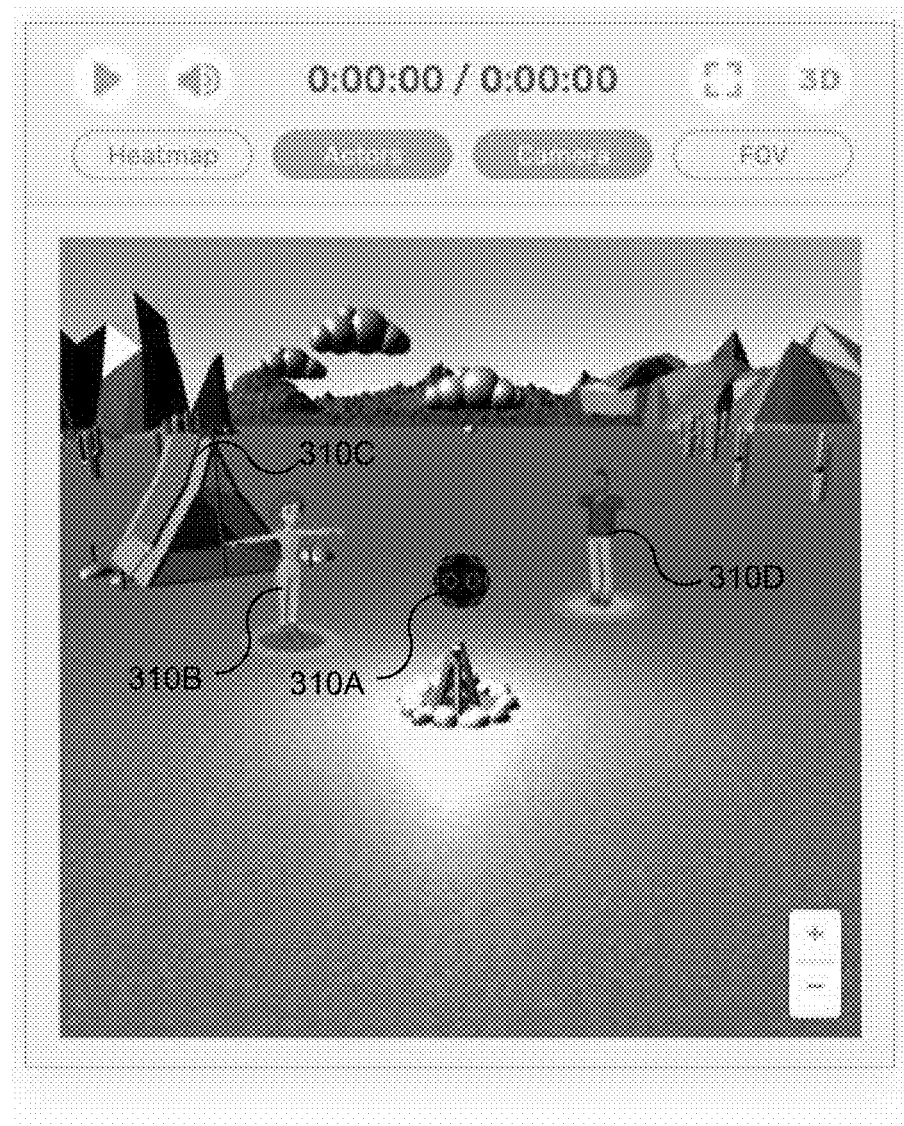

FIG. 3L illustrates an example of a 3D preview or pre-visualization of a scene. In this example, the 3D preview is represented as a birds-eye view. Characters and objects can be represented by corresponding 3D models/images. Actions and/or interactions are represented using animation. Sound/dialog (whether input by the user as noted above or later-introduced) can also be presented as part of the 3D preview. This 3D preview provides a user with an easy and efficient way to grasp where, how, when, and which characters/objects interact. It should be noted that the camera view may be adjusted in this 3D preview. That is, all perspectives may be considered and generated when the 3D preview is created. Camera view may be controlled by a user actuating the representation of camera 310A. It should also be understood that the 3D preview is representative of the FOV and/or the portion of a scene actually being captured by camera 310A.

To summarize the user perspective, the disclosed platform provides script, visualization, and previewing functionality through various components (FIG. 2) that can operate separately or in conjunction with each other. In some embodiments, they share defined interfaces, and can support additional components/functionality.

In some embodiments, the UI itself is built with web-technology (HTML5, node.js, angular.js and Cascading Style Sheets (CSS)) and therefore multi-platform compliant. UI-Controls built in WebGL with Unreal Engine can provide the aforementioned 2D and 3D visualizations or previews. Back-end functionality may be written in C# and contains all logic to handle user inputs to create a consistent story. External components, like persistent data library 220 and NLP core 224 can support the data processing (NLP servers with their pre- and post-processing of the received data, written in Java and Prolog) and can accommodate cloud functionality for multiple devices. The data stored in persistent data library 220 may be generated/stored in a project-like structure for consistency and conformity purposes.

Scene metadata which has been prepared by the back-end logic can be delivered over JavaScript Object Notation (JSON) interfaces to the controls. UI "pages" (i.e., the script and timeline views) and their associated controls/other UI controls are represented by their own typescript classes and predefined layout. Containers inside those views are filled dynamically by the data the back-end provides over edge.js to the pages. The UI Controls initially contain all the models, environments and animations to function; however, the back-end provides logic to upload models in a predefined 3D format.

Regarding the back-end logic, every input (either by user or by the system during reading script file) will be parsed by the back-end logic and it is decided how the data will be processed. Data could be sent to external components for consistency check and identify persons, actions and objects. However, the logic can also decide if this text is only relevant for a dialog/direct speech and only has to be represented with a corresponding dialog module.

All data gathered will be used to generate multiple outputs: a logical consistency-checked story for the script- and timeline view, enriched data for the visual controls to build up the scene preview and also generating requests to external components. Additionally, the back-end will also feed the interface for the persistent layer.

Consistency checks, identifying characters and objects with their actions are all based on natural language processing (Stanford NLP Core). As described above, in some embodiments, these functions can be handled by one or more of the frontend analytics engine 204, the backend analytics engine 212, or the NLP core 224. In some embodiments, this processing is relegated to the NLP core 224 due to intense processing requirements relying on heavy memory consumption and processing time. This can also reduce complexity on the client-side (back-end and corresponding frontend UI). Furthermore, the platform (or portions of the platform) represented as system 200 (FIG. 2) may comprise other external operations/elements, e.g., metadata processing element 226, enriched with metadata to process even more functions before and after natural language parsing. For example, metadata processing element(s) 226) can be used to identify if a character died during some action, and the character is not able to continue with a second action.

Figure 4:
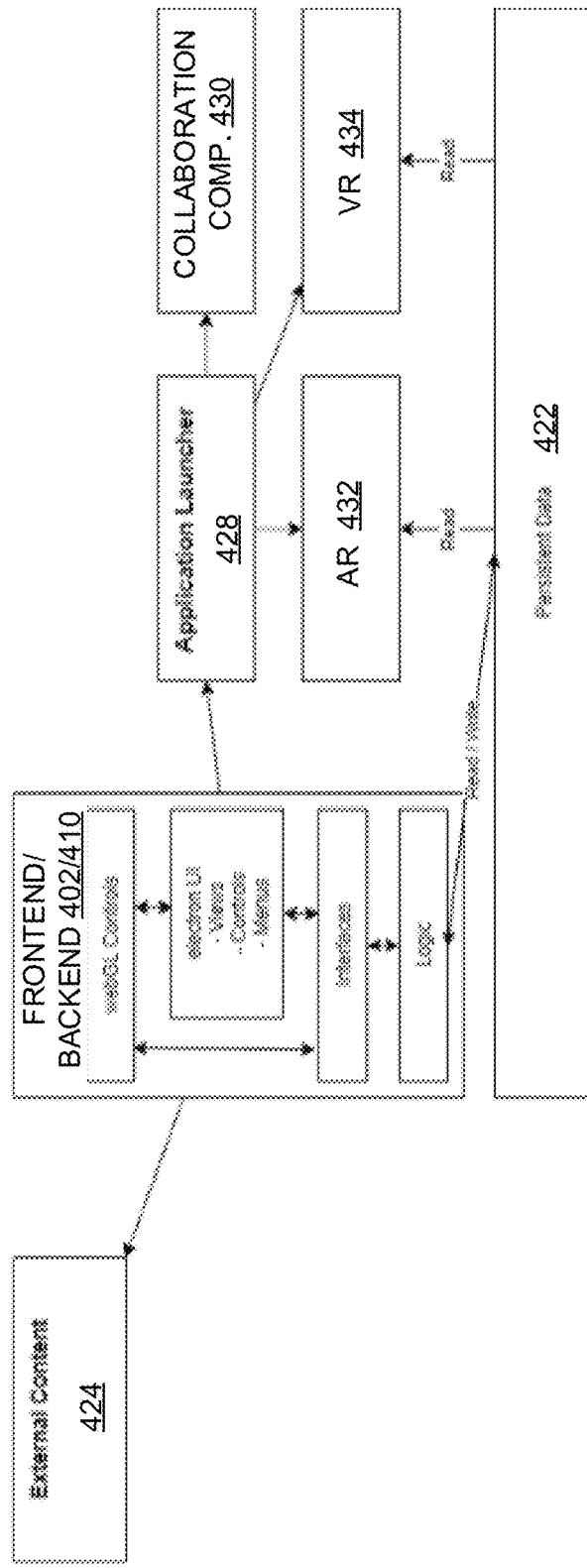
FIG. 4 is a schematic representation of a virtual reality data control/user interface system architecture in accordance with various embodiments.

The platform's persistent layer fulfills multiple needs. Based on a XML- and folder structure, projects are saved and loadable, e.g., at/in persistent data library 220, they are interchangeable for collaboration and they build the basis for other applications, namely VR and augmented reality (AR) applications. FIG. 4 illustrates an example platform 400 that highlights the platforms external connections and extensions/interactions. FIG. 4 illustrates a representation of the frontend/backend 402/410 of the platform that comprises the aforementioned UI controls, interfaces and logic (which may be respective embodiments of frontend/UI 202 and backend server 210 of FIG. 2). Also illustrated is an example of an external content component 424, which may be an embodiment of NLP core 224 (FIG. 2), as well as a persistent data component 422, which may be an embodiment of persistent data library 222 (FIG. 2). Moreover, platform 400 may include an application launcher 428 that can be used to launch other components/applications (e.g., AR/VR components 432/434 below). Additionally still, platform 400 may include a collaboration component 430 allowing interactions between platform 400 and other systems/applications, as well as AR and VR components 432 and 434, respectively. AR component 432 and VR component 434 may by embodiments of a preview device 222 (FIG. 2) or other system or device to which 3D previews may be transmitted for presentation or for augmented/virtualized realization.

It should be noted that platform 400 may be configured such that it is compatible with various operating systems, e.g., OS-X, MICROSOFT WINDOWS, etc., by using an Electron framework. To ensure the ability to allow users and other entities/providers to collaborate, projects are file-based and interchangeable. This can be expanded to a database and/or a cloud share. With robust backend logic, requests can be handled, and encryption of personal data can also be enabled.

The aforementioned use of AR/VR devices or applications can be realized using "side-applications" (AR/VR components 432 and 434) that provide full AR/VR experiences using, e.g., head-mounted displays (HMDs). They can access the same persistent data and can use the same algorithm for building the project (a consistent story and a timeline). However, they can provide different ways of interacting with a story so the user is be able to navigate through created stories, to have a series of interactions, and to manage the story in general.

In this way, a user can have a very early pre-visualization of a story. Every sentence written (for example describing an action between two actors) will lead to an automated animation with a correct interpretation of either predetermined or learned conditions. Those detailed visualizations allow a user to focus on future tasks which are far more user friendly in a 3D preview than a textblock.

The platform 400 manages user input (mouse, keyboard and speech) and system input (read existing projects), the logic itself, external connections and persistent data. This include but not limited to (as described above): drag and drop standard and custom controls in the UI; just-in-time and on-demand parsing of written text with an external natural language component; recording of spoken text to be saved as audio file or parsed by a speech to text engine; providing library functions (creating, selecting, storing objects like actors, locations, scenes, objects, cameras) with corresponding suitable actions and methods such as animations; uploading of user-defined locations as models or as 180/360 degree videos; defining camera cuts, movements and transitions as well as their position & orientation.

In some embodiments, platform 400 is implemented as a Client-Server architecture. This leads to a platform that can run on a user's computer locally, yet still have the ability to have custom component/modules, data processing and/or even single pages, on a remote server.

The frontend 402 of platform 400 may contain two main views and multiple managing pages, two standalone-controls, library-controls and module controls. Additionally multiple pages and modal forms for manage the project(s) and creating content. Each of platform 400's views and managing pages are represented by a single page and special logic in their function class. Project-wide logic and controls are available for every page. The use of node.js, java- and typescript and also HTML5 will provide the interaction between the user and the views, modal forms and modular controls.

The UI associated with the script view allows the user to insert modules and build a script. As previously described, different modules are available, e.g., "Dialog", "Action", "Transition", and "Location." The user can drag them onto the script view. The UI determines where the module will be inserted: above all other, between two existing modules or at the very end. Embedded controls can include the module list: (as mentioned) with "Dialog", "Action", "Transition", "Location." For uploading a script, a control is provided which allows the user to upload a script in a predefined format (text file with labels). The UI will tell the logic to parse the script and the logic will determine itself the different types (identify dialogs, actions, etc.), what needs to be processed by external components (natural language engine), and so on. For script printing, a control is provided to render a PDF directly from the visible text, either with additional description labels or without.

Additional controls which are represented by a software command pattern in the logic allow for undo- and redo-actions. A control provides for audio recording, which as alluded to previously, allows the user to upload audio (to use as environment background sound or directly passed to a speech to text engine) for further processing. Another control can be implemented to let the user search for characters and words in a script. Keyboard shortcuts controls can be implemented to allow the user to use different shortcuts to create a new module just below a current module, for example. Filters can also be implemented depending on need, e.g., filtering by character, showing dialog with/without recorded audio, etc.

The script view provides all the functions of the controls mentioned above, to send the needed events to the logic with all the needed arguments. Furthermore, it shows different UI styles (labels) to enable fast identification of one or more of the following: where a scene starts and ends; where a location changes; what camera cuts and transitions are in the script; and all the modules in different styles (i.e. passive description text in italic, spoken text by an actor with their name and color as a label).

The timeline view allows the user to see and modify a story in timewise fashion. Characters, objects and camera(s) are represented by a horizontal line, while actions, transitions and dialogs of the actors/objects/camera(s) are shown as different expanded lines (boxes) on the corresponding line. These aspects can be fully interacted with by the user. The user can hover over the boxes which will show additional information. For example, hovering over a dialog box will show the dialog text in the tooltip of the cursor.

Embedded controls can include the following: Add/Edit environment sound which allows the user to record/delete environment sound which will be represented in the UI as a soundwave; Add/Edit actor/object/camera which allows the user to add already known actors/objects/cameras to the scene by using this menu. It should be noted that every added actor/object/camera can be represented by a line but does not have to be mandatory; Add/edit action/interaction wherein if a user hovers over a line, an icon appears when the cursor hits the line (is near) helping the user with add/edit actions/interactions directly to the corresponding user at the given time (determined by the position of the line).

Different modal forms can appear depending on what the user selects (i.e. if the user selects "add action", the form shows all the available actions relevant to the add action).

In, this way, the user can adjust or expand a script or even build a script from scratch. All the mentioned controls above provide their desired function (e.g., by sending data to the back-end on an interaction). Furthermore, certain specialized functions are available. A Drag & Resize boxes functions can be provided with which the user can use to drag displayed modules (box on line) to a new time, although the box cannot change the owner (drag from one actor to another). Additionally, the user can resize the box which will lead to a new duration of the module. Custom actions of an actor are also available—these can be, e.g., "mark as out of scene", "mark as idle," "enter scene," and "mark as non-idle."

With the aforementioned simple (2D) and complex (3D) visual representation of all the actors, objects and objects inside the scene, very early pre-visualization with different level of details can be provided to the user. Those levels include show/hide camera field of view, and show/hide actions such as movement and interactions between objects and or actors. These controls are built with a 3D engine (Unreal) and provided as a webGL object to be synced directly with the back-end as well as the front-end.

Embedded controls can include show/hide heatmap control which makes a layer visible (controlled by the 3D engine) and displays the action (heat) as an overlay over the terrain. The embedded controls can also include show/hide actors control which shows or hides all actors in the scene, FOV control that shows or hides all the field of views for all the cameras in the scene. With all these controls, a user can plan next steps during scriptwriting.

Moreover, controls are provided that allow the user to zoom with an input device such as a mouse, and a play/animate control that allows the user to play a particular scene.

Library controls are provided that allow a user to obtain an overview of all the actors, objects and locations available in a project. More functions like creating, copying and deleting content (actors, objects and locations) are also available. Those controls need not be related to a 3D engine or to a webGL build, but may be built with the same technology as the main forms (Node.js & HTML5). 3D visual representations may be available as thumbnail images.

Multiple pages (views) can be provided to the user that support a full creative workflow, project editing, etc. All pages many have similar functions since they allow the user to register objects with all the needed attributes, validate those attributes, and save them in the back-end logic. All further processing (e.g., storing to persistent data) can be handled by the back-end.

Back-end logic is written in C# and has defined connectors for the front-end. Currently, the platform 400 can serve two front ends, e.g., the main UI, an electron-client over edge.js, and the webGL built over the same interface. The Back-end functions are divided into services, where each service is represented by an interface (based on a Zenject dependency injection framework). The application hierarchy starts at a central class for one instance of the application that handles and manages project loading, saving and unloading, as well as project creation. Both the application and project classes provide events for all occurrences modifying the resources they manage.

The back-end controls following different types of data: projects, scenes, entities (aka objects), looks (all objects have a predefined look how the preview should be rendered. This is defined by a primitive which every preview engine can determine by itself of how to render, affordance descriptions (discussed below), and (smart) objects (a construct for every smart entity with a given set of affordances, a defined name and look). This can also be defined by (smart) actors (an extended smart object but used for actors with a unique color), (smart) cameras (an extended smart object but with a different set of default affordances), and the aforementioned modules that acts as the "building blocks" for creating a scene. Each module has a start and end time (which is either be calculated by the logic (through the length of the dialog) or given by the user through the manipulations in the UI). Further still, this can be defined by interaction groups (an object which represents a given group of actors/objects which are joined over time. The platform gives the ability to have a simplified representation inside a scene even if a lot of is happening.) Furthermore, the back-end provides access to functions such as: NLP-Client (i.e., sending and receiving data from NLP core 224 (FIG. 2); a parser (a parsing service which only accepts strings by direct input through the logic itself or the user and returns an expected result-set (i.e. list of objects, spawned affordances, etc.); and a persistence layer which provides methods of storing and reading projects and entities.

Regarding affordances, platform 400 uses a built-in tool referred to as an "affordance". An affordance is different to an action (e.g., pick up a stone). Rather it's a direction that has to be reverted. The owner of the affordance (stone) provides a set of affordances over which the owner has control. The user (actor) initiates the action (pick up), but the owner (stone) controls and executes it. This structure gives platform 400 the ability to control actions through an easy approach.

Figure 5B:
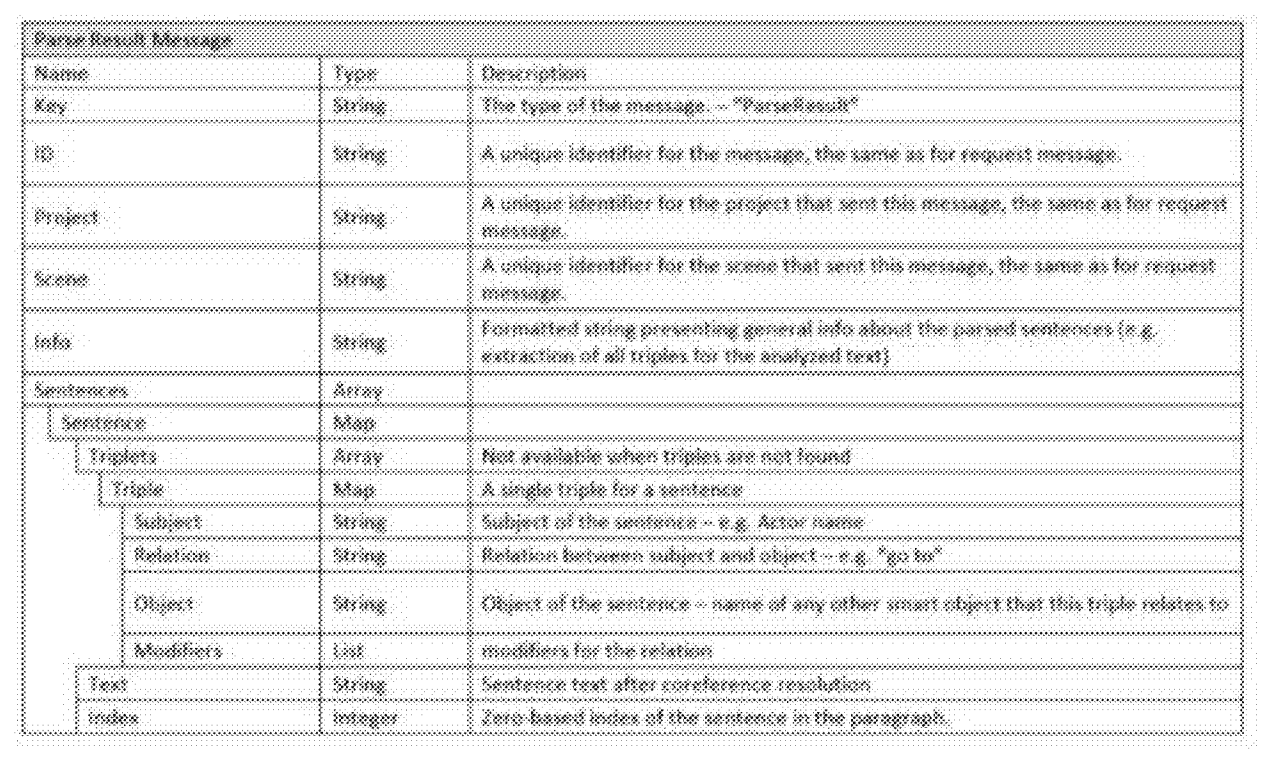

As noted above, platform 400 may use external resources, such as NLP core 224 to process data and user input. To reduce the complexity and the requirements on the client application itself (memory consuming databases), aspects like the natural language parsing and therefore the pre- and postprocessing of those inputs are performed on an external server. Accordingly, platform 400 may send requests to the external resources. A JSON structure uses descriptions such as those illustrated in FIG. 5A to parsing a request message from platform 400 to an external component, such as a NLP core 224. A parse result message may use descriptions such as those illustrated in FIG. 5B. Similarly, descriptions used in interaction group request messages are illustrated in FIG. 6A, and the descriptions used in interaction group result messages are illustrated in FIG. 6B.

The interfaces of platform 400 may be used to connect frontend and backend logic. The connection can be made with edge.js, which are wrapping functions that allow logic dynamic link libraries to be called over the defined edge.js interface. The interfaces can handle different inputs, e.g., drag and drop inputs from mouse or input device-events, keyboard shortcuts, etc. The interface also contains a container to store complex objects on both sides (C# and node.js). Therefore platform 400 is able to attach frontends which can read C# and all others (with a defined JSON structure). FIG. 7 illustrates an example interface.

It should be noted that platform 400 can manage user inputs and device how they should be processed. Written inputs (e.g., when a user manually inputs a script) can be sent directly to, e.g., NLP core 224. Furthermore, events from the back-end can also interface with external components, e.g., when a script is loaded, and process it directly. Moreover, an external application, e.g., AR/VR applications 432/434, can be launched using application launcher 428. These executables or components may be fully independent, yet access the same persistent data. To exchange data, platform 400 is able to read project folders and files. Different users with different instances of platform 400 (or frontend/UIs) can collaborate, e.g., via collaboration component 430.

The use of natural language processing has been discussed above and in the context of the present disclosure can be used to parse a script, infer knowledge/information, etc. Although various forms of NLP are known, natural language capabilities pose a challenge in inferencing information from complex stories. That is, natural language understanding has a long way to go before being able to match the level of inferencing the human brain can make from reading a story.

Another challenge lies in the ability to analyze, compare and sort information extracted from a screenplay or a script in order to provide the functionality described above that allows the user to create/edit scripts, generate previews, etc. all while remaining contextually consistent. The field of computational narratives has advanced greatly to represent narratives with the help of story graphs, but these current data structures cannot be formed directly from a text-based story. Other difficulties arise when representing relationships between characters to a user in way that the user can easily see which characters are currently interacting with each other and appear in the same place in the story.

In accordance with various embodiments, the use of basic/atomic knowledge elements (also referred to as knowledge bytes) is contemplated. Knowledge bytes represent the information encapsulated in the script. Additionally, the implications of comparing knowledge bytes with each other to form pairwise relations among knowledge bytes allows for recognition of similar and contradictory knowledge bytes.

Additionally, various embodiments use character systems that allow for knowledge bytes to be associated with one or more characters based on the characters in a narrative that experience these knowledge bytes in the form of beliefs and desires. This creates a coherent representation of the possession of knowledge in the story. Moreover, each character system can use logical inferencing on the information that it possesses. With the help of the relationships between knowledge bytes, it is possible to recognize belief/desire contradictions or similarities among different characters in the narrative, enabling future work towards defining relationships between characters as a combination of intentions and beliefs.

Moreover, various embodiments enable script creators to add reasoning rules and errors vis-à-vis rule sheets. Rule sheets are capable of parsing structured natural language text to generate certain categories of rules and errors, which can then be used by the character systems, enabling them to make logical inferences on the information they possess.

Further still, the idea of interaction groups is introduced, where characters interacting with each other in a certain time during the story are considered to be group. Interaction groups are automatically created when characters perform actions together or a character is moving from one place to another where other characters are already present (FIG. 3F).

Figure 8:
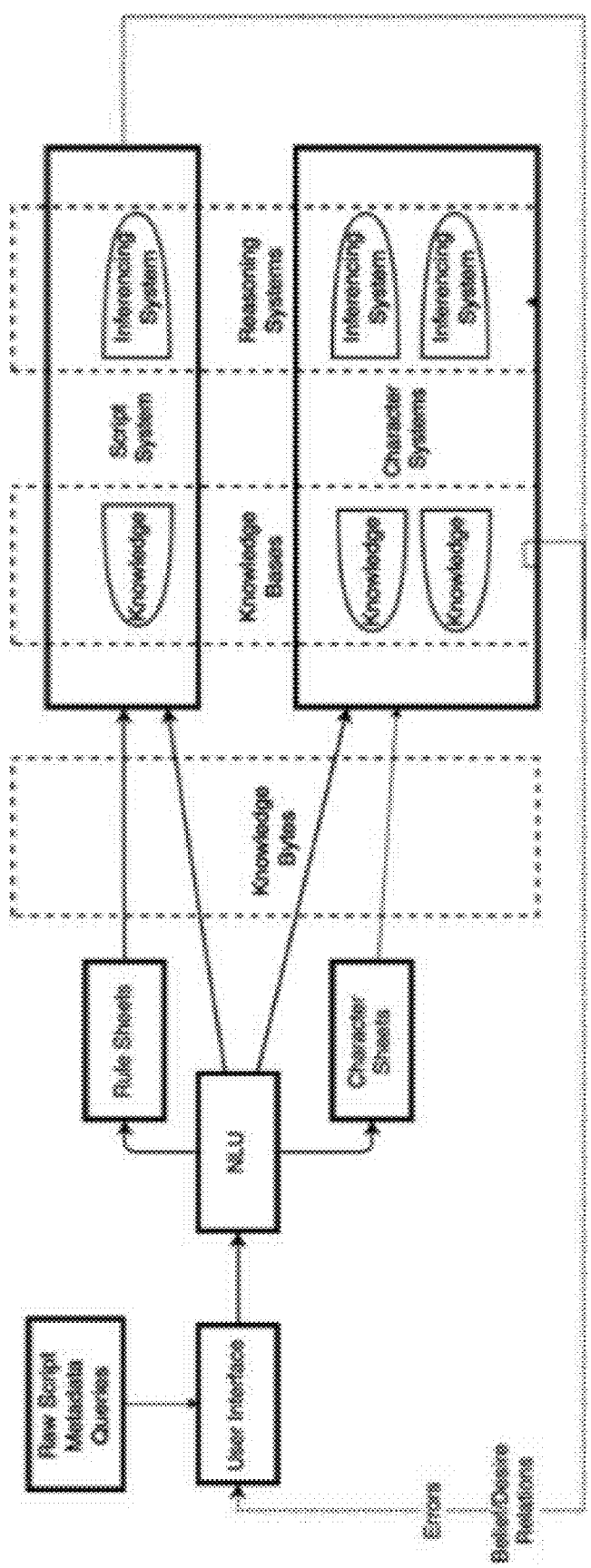
FIG. 8 is an example architecture/workflow for natural language processing in accordance with various embodiments.

FIG. 8 illustrates an example architecture/workflow for natural language processing as implemented in accordance with various embodiments. It shows how the creative content originating from the user is processed through natural language understanding, and further broken down to a stream of knowledge bytes and fed into various character systems and the script system. Moreover, the reasoning and inferencing done by the script system and character system results in feedback in the form of errors and belief-desire relationships, which is relayed back to the user. The rule sheets and character sheets act as alternate forms of retrieval of logic and character background respectively.

Inputs to the user interface are presented in three various forms. The raw script itself is used to build the knowledge base for the system. A raw script can refer to a representation of the main story plot, e.g., actions of single characters and interactions between characters, as well as character dialog. The raw script can be stored in a story knowledge base.

The metadata such as rule sheets allows the system to understand and make inferences, and character sheets are another source for information retrieval. That is, metadata allow rules and/or error definitions to be specified in the form of a story world knowledge base. Moreover, metadata can be used to add information about characters, e.g., background information, that are stored in a character knowledge base.

Queries from the user are also a form of input, where the output comes from the script system and reasoning system in the form of queries and belief-desire relationships. Queries allow reasoning regarding the knowledge stored in a story knowledge, story world knowledge, and character knowledge bases to be obtained/ascertained by using a knowledge reasoning system (described below). Input can be analyzed using NLP core 224, which can also create the knowledge byes, being a base of information flow.

All the inputs provided by users are then analyzed using, e.g., a Stanford CoreNLP framework, with extensive usage of Enhanced++ Dependency graphs. Actions and dialogs are processed in order to create and save knowledge bytes containing new information. In the case of user questions, inferences about the stored information are made, and output based on the inferences are presented to the user. If there are any problems during text analysis, appropriate errors are returned to the user interface too.

As previously noted, knowledge bytes are basic elements or "atoms" of information being passed on to the system, e.g., platform 400 (FIG. 4). A parser can be used to translate all information into a stream of knowledge bytes which can then be passed to respective character ad script systems.

The script system stores all the knowledge bytes that are present in the script, and also in the character systems. It can access each character's knowledge base and check for errors and relationships based on similar or contradictory beliefs and desires.

The character systems contain multiple knowledge bases and logical reasoning systems, e.g., one for each character in a story or narrative. They are responsible for storing snapshots of the story as a representation of what each character perceives about the world around them, along with their "brains" in the form of the reasoning systems. These systems allow for character-centric representation and reasoning for the story as well.

Rule sheets are used to define rules and error definitions for stories. Rules can be provided by users in natural language, after they are automatically translated into a form used by a logical reasoning system. As soon as there is a query from a user, the logical reasoning system combines information stored in the script and character systems with information provided in rule sheets to answer questions, show possible errors in a story or relationships between the beliefs of different characters, etc. FIG. 9 presents rules created for example sentences, recognizing beliefs and desires of characters and containing information about time and location of interactions.

In some embodiments, one character sheet corresponds to one character in the story and is used to define its background—a history that happened before the start of the actual script. All information contained therein is added to the corresponding character system and used while asking questions about the character and its knowledge.

Figure 10:
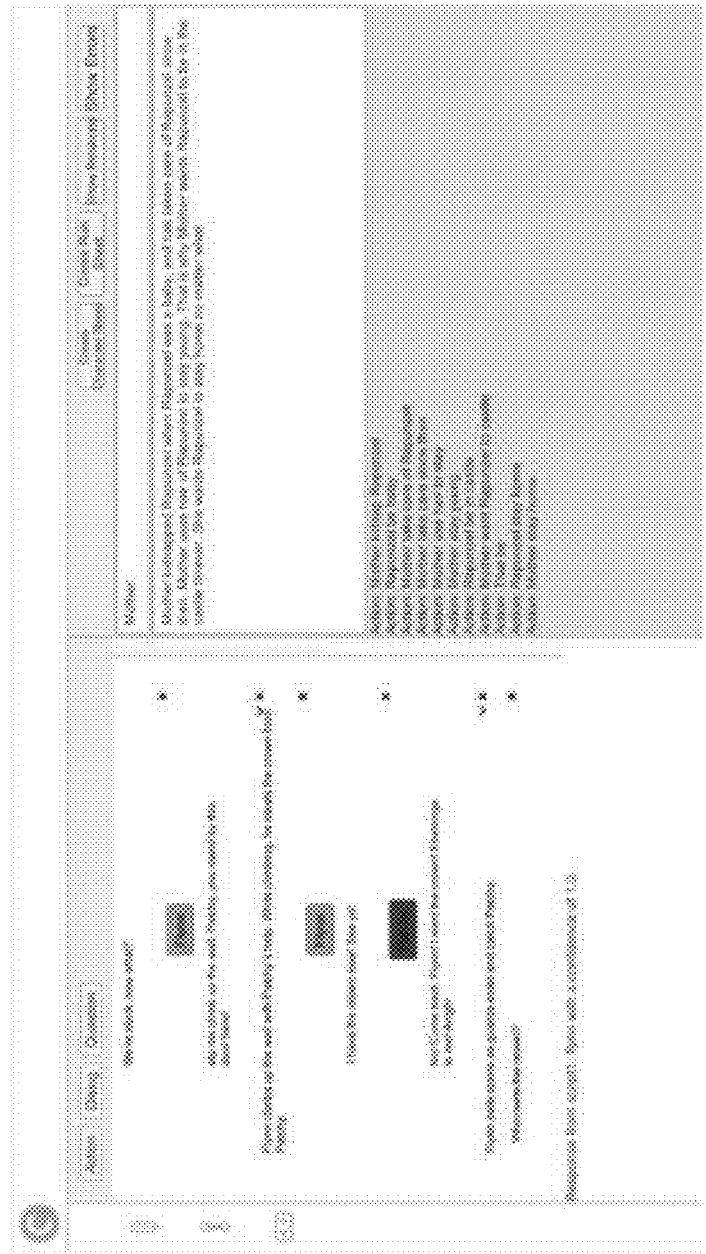
FIG. 10 is an example of natural language processing-based script development that includes rule and error definitions in accordance with various embodiments.

FIG. 10 presents a tool that allows users to create story scripts and specify rules and error definitions, which may be presented via frontend/UI 202 (FIG. 2). It's layout is similar to that of editing panel 204. FIG. 10 illustrates an example query in a form of question "Who owns the crown?" that generates a response after analyzing the whole script provided by the user. In this way, a user can easily address or pre-emptively avoid any thematic or contextual inconsistencies without having to, e.g., manually re-read a script.

Figure 11:
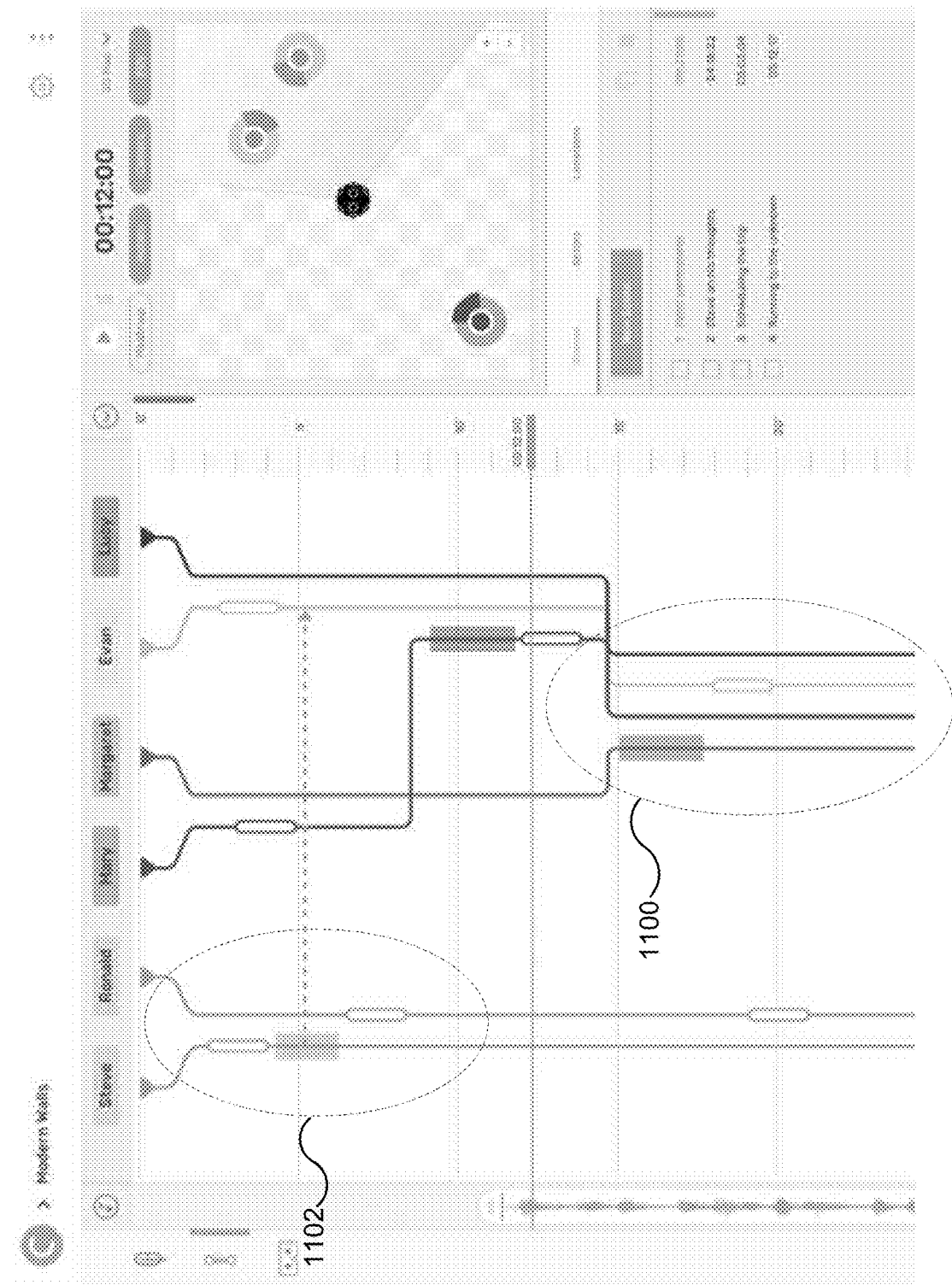
FIG. 11 illustrates example functionality of a visualization panel associated with group interaction during script development in accordance with various embodiments.

FIG. 11 illustrates another example implementation of interaction groups (also described above and illustrated in FIG. 3F). FIG. 11 illustrates a first interaction group 1100 comprising the characters Mary, Margaret, Evan, and Lucy. A second interaction group 1102 includes characters Steve and Ronald. It should be understood that interaction group 1100 may be formed upon the character Margaret joining the characters Mary, Evan, and Lucy.

The particular details regarding knowledge bytes will now be discussed. As noted above, a knowledge byte can be defined as the smallest unit of information about a narrative. It can represent any kind of information present in a script, such as action, dialog, or questions. Moreover, the knowledge byte also has support to store the location, time point, and the coordinates where it takes place. This is done in order to process spatial knowledge which can be used for spatial reasoning, which could be used to support newer forms of storytelling.

The structure of the knowledge byte is as follows:
Unique ID—every knowledge byte extracted from the script has a unique identifier;
Time point—every knowledge byte has a time point to keep track of the point in time in the narrative at which this knowledge byte was first produced;
Coordinates—each knowledge byte is associated with three-dimensional coordinates to allow for spatial reasoning and representation of knowledge bytes;
Locations—considering that the medium of text is a script, knowledge bytes can also store the location where they are created, to allow for location-based representation and reasoning, as well as location-based questions;
Subject—the subject of the knowledge byte; Relation—the relationship that is being stored;
Object—the object to the relation;
Relational Modifier—the knowledge byte uses the relational modifier to store additional information about the relation (commonly used for prepositions);
Relational Object—the relational object stores the object that may accompany the relational modifier;
Relational Question—the relational question stores a question tag if the knowledge byte is a question, and allows the platform to look at what question the user is asking;
Negation Flag—a negation flag allows the knowledge byte to keep track of negation;
Speaker—when using a knowledge byte to represent information from dialog, the dialog speaker is stored as part of the knowledge byte (and can be used to compare characters learning about similar or contrasting information from multiple sources).

The importance of breaking down the information into knowledge bytes is that these knowledge bytes represent information in the forms of beliefs or desires, and can be stored across multiple characters' knowledge bases. This linking of knowledge bytes across various characters' knowledge bases allows for interesting and illuminating inferences (discussed below).

The introduction of knowledge bytes as a data structure for handling information about stories enables many useful operations. These knowledge bytes can be sorted and oriented based on different parameters. The knowledge bytes can be sorted by time as well as space or location, depending on the amount of information the user chooses to provide to the system through user input. Alternatively, the knowledge bytes can also be aligned, based on the characters' knowledge. For example, the distribution of information across various characters can be observed.

As noted above, different knowledge bases may be created and used in accordance with various embodiments.

The story knowledge base is responsible for storing all the knowledge bytes that are present in the script, along with references to the various characters as well. Every knowledge byte from the script is fed to the knowledge base for the story knowledge, and this allows for reasoning on the information stored in this knowledge base as well.

The story world knowledge base is responsible for storing all the knowledge bytes relevant to a story world. That is, any knowledge bytes that relate to rules, themes, parameters, etc. associated with a particular story world or series can be stored in the story world knowledge base. In this way, any potential inconsistencies, even across stories, can be avoided.

Character knowledge bases are used to form a knowledge base for the information possessed by each character, and in order to allow the reasoning system to be able to let each character work on their own set of beliefs and desires in a story world. The benefit of having separate character knowledge bases for each character is that it allows the scriptwriters to ask questions to each character and gauge the difference in their responses based on the information that the character system possess.

Moreover, each character knowledge base stores knowledge bytes with some wrapper information, which describes the relation between the character specific knowledge base and the knowledge byte. The relation-specific wrapper contains information about the character's confidence about the knowledge, the time point that the character learns about the information, and flags that denote whether the knowledge byte is a belief or a desire. Feedback from the character's reasoning system is also stored, in order to be sent back to the UI.

The core of the knowledge reasoning system is the logical reasoning environment. Moreover, all the character knowledge bases and the story knowledge base have their own logical inferencing environment. The processed story world knowledge and the knowledge bytes are fed into the inferencing system. The inferencing system is queried for any possible errors, and whenever the user directs a question to the particular character.

Logical reasoning can be used by a character system to perform reasoning capabilities. With the help of rules, it is possible to make deductions and extract deeper information from the information that is stored in the knowledge bytes. Another use for the logical system is to answer questions, e.g., generating Prolog queries, querying them across various instances, and reporting the results back in response to user questions or belief-desire relationships. GNU Prolog for Java can be used to implement a logical knowledge reasoning system. That is, multiple types of Prolog facts can be used to store various parts of the knowledge bytes.

Belief facts store or represent the most important information from the knowledge byte and store it in a character system's reasoning system as a belief. The belief facts take two forms:
belief(Id, Subject, Relation, Object, NegationFlag).
belief(Id, Subject, Relation, Object, NegationFlag, RelationalModifier, RelationalObject, RelationalQuestion).

Desire facts refer to the same or similar information as that represented by belief facts, except that they are stored in the reasoning system as a desire. They have two forms:
desire(Id, Subject, Relation, Object, NegationFlag).
desire(Id, Subject, Relation, Object, NegationFlag, RelationalModifier, RelationalObject, RelationalQuestion).

Location facts represent locations or scene information, and reference the knowledge byte ID. Location facts are formatted as follows: location(Id, Location).

Confidence facts store the confidence level as a floating value from 0 to 1, and have the following format:
confidence(Id, Confidence).

Coordinates facts are similar to confidence facts, but the coordinates facts represent information about the coordinates of the knowledge byte. coordinates(Id, X, Y, Z).

Time facts allow reasoning systems to be built with temporal reasoning capabilities, and have the following format:
timeof(Id, Time).

Additionally, the rules and errors in the reasoning system can be used. They can be added by users through a story world knowledge base. The formatting for rules/errors can vary (an example of which is illustrated and described above regarding FIG. 9).

Reasoning across knowledge bases involves the comparison of knowledge bytes in the various knowledge bases in order to check whether they have a similarity or a contradiction. Looking for a possible connection between knowledge bytes is essential to make inferences across knowledge bases. Using Wordnet synonyms and antonyms for the relations used in knowledge bytes can be extracted. The knowledge bytes can be compared to form relations between them. Various algorithms may be used to compare the similarity and knowledge bytes.

A relational factor θ is calculated based on the lexical comparison of two knowledge bytes, which is a measure of how related they are. θ varies from −1 to +1, with −1 denoting contradictory relation, a +1 denoting similarity between the knowledge bytes, and a θ closer to 0 representing that the knowledge bytes may be unrelated.

Time points and confidence measures are also taken into account to analyze relationships between knowledge bytes. By default, in one embodiment, a 0.8 weight to confidence and 0.2 weight to time have been assigned in order to make the impact of confidence stronger than time. In some cases, for some pairings of knowledge bytes, there is an ability to specify custom values for the weights for confidence and time. This may be relevant in cases where one may require different level of impact of the difference in time or confidence of the two knowledge bytes on the possibility that the two knowledge bytes are indeed related.

For any two knowledge bytes, θ denotes the relational score for the related knowledge bytes. Moreover, the time and confidence values for a knowledge byte can be denoted by $T_x$ and $C_x$ respectively. It can be assumed that N is the final time point of the script.

The equation for determining the relationship between two knowledge bytes is represented below.

$$\text{Relational Factor} = \frac{|C_2 - C_1|C_W + \frac{|T_2 - T_1|}{T_N}T_W}{\theta}$$

In order to form knowledge bytes necessary information is extracted directly from the script written in natural language. The tool for interaction with the user is written in C# and is running locally. Scriptwriters are able to provide three different types of input: actions, questions and dialogs, each in a specifically designated type of the input field.

Natural language understanding in some embodiments may be performed independently on a remote server running a parser written in Java and cooperating with the Stanford CoreNLP framework, i.e., NLP core 224 (FIG. 2). The information exchange between a local client and a server is performed using a universal JSON format. CoreNLP allows a set of chosen annotators to be used, and specific properties for any annotator can be adjusted according to user's needs. These properties can be set independently for every query.

While parsing a script different kinds of input can be distinguished by assigning a speaker field to each text input—action for a script, question for a question and a name of a currently speaking actor for a dialog.

It can be assumed that users input text in paragraphs consisting of logically connected sentences and every new "thought" should be put in a new paragraph, i.e., a new action, dialog or question input field must be created by the user.

A first step of parsing any paragraph involves applying co-reference resolution to the whole text in the paragraph— it is focused on assigning real names of actors/objects/places to personal pronouns ("he", "they", "it", etc.) based on previously analyzed sentences. An example input "Adam buys a new phone and he uses it" would be translated into "Adam buys a new phone and Adam uses a new phone."

Moreover, a coref annotator can be used, and a coref.algorithm property can be set to "neural" in order to use a more precise (but slower) neural-network-based resolution. Alternatively, if speed is more of a concern, a specific value for coref algorithm property need not be assigned in order to rely on a more basic deterministic system.

After applying the co-reference resolution, text is then split into individual sentences, which are later tokenized and single words (tokens) are extracted. Each token is usually related to others, which is resembled in tree-like constituency and dependency graphs. That is, subjects, relations and objects—so-called relation triples, are extracted. As a base for triples generation, the Stanford Open Information Extraction was used in accordance with one embodiment, Alternatively, if many possible relations are missed, a custom pipeline can be created and used to cope with more complicated sentences. They include simple, continuous, past and present tenses, and active and passive voice.

A standard way of creating knowledge bytes involves extracting:
  Subject—a noun—forms subj dependency with relation
  Relation—a verb—usually a root of dependency tree
  Object—often a noun—forms obj dependency with relation
  Negation Flag—boolean—True if relation, object or relational object has any negation (neg) dependency
  Relational Modifier—usually precedes relational object and forms case dependency with it (e.g. "go to someone")
  Relational Object—usually forms a nominal modifier (nmod) dependency with relation (e.g. "go to someone")
  Relational Question—described in section 7.3

There are some exceptions from the standard way of extracting components of knowledge bytes. The most common case is while using a verb "to be", as it has different meanings depending on the context:
  an auxiliary verb (aux), usually the case for continuous tenses, e.g. for sentence "Adam is going to school" the actual relation would be "go"
  a passive auxiliary verb (auxpass), used for passive voice, e.g. for sentence "Adam was chosen" the actual relation is "was" and the object is "chosen"
  a copula (cop), used mainly for describing subject, e.g. for sentence "Adam is honest" the actual relation is "is" and the object is "honest".

It should be noted that an object either may not be set (see first example in Table 1) or does not have to be a noun as in the case when the relation token and the object are connected by open clausal complement (xcomp). An example sentence "Adam does not enjoy going to school" is then resolved as an extended form of knowledge byte as shown in the second example of Table 1, where the object is a verb "going." For sentences involving more than one subject, relation or object several triples can be created, each consisting of one subject, one relation and one/no object as shown in the third example of Table 1. Additionally, adverbial modifiers forming advmod dependency with verbs can be extracted, although they need not necessarily form part of a knowledge byte.

Each paragraph and each sentence in the paragraph are indexed and used to provide a proper timing, saved as a time point in the knowledge byte. All triples generated from one sentence are assigned the same time and resulting actions are set to happen simultaneously. It can be assumed that questions and dialogs follow similar structure as actions in a way that subjects, relations, objects, relational modifiers and relational objects can also be extracted.

With respect to parsing questions, the biggest difference is the possibility to extract question words, such as "who", "what," etc. They are found by looking for either subjects or objects (similar to actions), while making sure that they are relational pronouns starting with "wh" and stand at the beginning of the sentence.

Moreover, questions can be asked of or directed to a particular character by starting a question with his name. For example, after asking a question "Adam, who meets Isa?" or "Adam, tell me, who meets Isa?" a response about knowledge stored in Adam's character system telling us of what characters that meet or have met Isa Adam is currently aware can be received.

Dialogs differ in a way that the speaker is set to the name of the actor talking. During co-reference resolution we are additionally matching any usage of personal pronoun with lemma "I" to the name of the actor. While analyzing character's statements, an attempt is made to add gathered information to the character's knowledge system. This is done in order to be able to perform/obtain reasoning regarding a character's knowledge and compare it to other characters' knowledge later when asking questions.

While analyzing actions, how confident an actor is about what he stated in a dialog can be inferred. This is done by checking whether the actor is using one of the words present in a set of confidence words shown in Table 2. Each word is assigned a specific value in a range from 0 (impossible action) to 1 (sure that an action happened). For example, a sentence "I think that Wojtek owns the crown" stated by Adam would result in creating a knowledge byte containing a belief "Wojtek owns the crown" with confidence 0.4.

It can be assumed that all sentences provided directly in script have a confidence equal to 1.

Moreover, a distinction can be made between beliefs (normal statements made by an actor in a dialog or in a script, having a certain confidence) and desires. The latter are recognized by looking for words such as "want", "wish", "need" in a provided sentence, either in a script or a dialog. As a result, sentences "Adam eats chocolate" and "Adam wants to eat chocolate" would create knowledge bytes with similar components, but the former would be resolved as Adam's belief and the latter as Adam's desire to eat chocolate.

For desires, confidence measurements are not as much of a concern, so the confidence may always be set equal to 1.

In order to compare knowledge bytes, it can be important to determine whether verbs in two compared knowledge bytes are either synonyms or antonyms or none of the two. In order to resolve this issue, a WordNet dictionary can be used. While looking for synonyms, a check can be performed for all other words belonging to the same synsets as the query word. While looking for antonyms, the built-in WordNet antonym lists can be used.

Rule sheets allow scriptwriters to create rules that will enable automatic inferencing of information about the story and characters. Besides this, error definitions can be provided so that consistency of the story can be ensured. A scriptwriter is able to check for possible errors at any time during the creation of the story.

Rules and errors can be provided in a natural language and they are automatically translated into a Prolog language structure. In order to parse rule sheets TokensRegex can be used. TokensRegex refers to a framework included in Stanford CoreNLP for creating regular expressions over (a sequence of) tokens. A check can be performed for properties assigned to single tokens extracted by TokenizerAnnotator—lemma, named entity and a part of speech. Three main patterns for regular expressions can be used, each of them looking for specific structure of sentences provided in the rule sheet input field:

Type pattern
Inference pattern
Error pattern

Regular expressions used for different patterns are shown in Table 3 and example sentences with created rules are shown in Table 4. A name of A subject and/or object can be typed in all UPPERCASE letters to make a general rule for every subject and/or object (see inference and error pattern examples in Table 4). In other cases a rule for a specific subject and/or object (see type pattern example in Table 4) can be created.

Patterns can be combined. For example, type pattern inside inference and error patterns can be combined. Co-references and resolve desires and negations can also be combined. Moreover, while creating rule sheets, information about location can be included (by including a certain character and a time when the action specified was performed). An example of such a complex sentence is presented in Table 5.

Table 1: Examples of Parsed Knowledge Bytes

TABLE 1

Examples of Parsed Knowledge Bytes

| Sentence | Knowledge Byte |
|---|---|
| Adam cries. | belief(0,adam,cry,null,false). |
| Adam does not enjoy going to school. | belief(0,adam,enjoy,go,true,to,school,null). |

TABLE 1-continued

Examples of Parsed Knowledge Bytes

| Sentence | Knowledge Byte |
|---|---|
| Adam and Wojtek eat chocolate. | belief(0,adam,eat,chocolate,false). ↪belief(1,wojtek,eat,chocolate,false). |

TABLE 2

Confidence Words

| Verb | Confidence |
|---|---|
| sure | 1.0 |
| confident | 1.0 |
| realize | 0.8 |
| know | 0.8 |
| state | 0.5 |
| say | 0.4 |
| think | 0.4 |
| feel | 0.4 |
| suppose | 0.2 |
| believe | 0.2 |
| assume | 0.2 |
| presume | 0.2 |
| expect | 0.1 |

TABLE 3

Regular Expressions for Rule Sheet Patterns

| Pattern | Regular Expression |
|---|---|
| Type | (?$subject [tag:/NN.*/]+) [lemma:/be/] [tag:/DT.*/]+ (?$type [tag:/NN.*\|JJ.*/]*) |
| Inference | /if/ (?$condition [!lemma:/then\|,/]+) /then\|,/+ (?$result [ ]+) |
| Error | /show/ [tag:/DT.*/]* /error/ (?$error [ ]+) /if/ (?$condition [ ]+) |

TABLE 4

Example Sentences for Rule Sheet Patterns

| Pattern | Sentence | Rule |
|---|---|---|
| Type | Adam is a human. | type(adam, human). |
| Inference | If SOMEONE buys SOMETHING, then he owns it. | belief(Id, SOMEONE, own, SOMETHING, false) :- ↪belief(Id, SOMEONE, buy, SOMETHING, false). |
| Error | Show error "Too young" if SOMEONE is young and he drinks a beer. | error(Id1, Id2, 'Too young') :- ↪belief(Id1, SOMEONE, be, young, false), ↪belief(Id2, SOMEONE, drink, beer, false). |

TABLE 5

Example Complex Sentences while Creating Rule Sheets

| Sentence | Rule |
|---|---|
| If Adam is tired on Sunday, then he does not go to church. | belief(Id, adam, go, null, true, to, church, null) :- ↪timeof(Id, sunday), ↪belief(Id, adam, be, tire, false). |
| If Adam does not get a candy, then he becomes angry. | state(Id, adam, angry) :- ↪belief(Id, adam, get, candy, true). |

TABLE 5-continued

Example Complex Sentences while Creating Rule Sheets

| Sentence | Rule |
| --- | --- |
| Show error "Bad habits" if Adam wants to eat chocolate and he is fat. | error(Id1, Id2, 'Bad habits') :-<br>↳ desire(Id1, adam, eat, chocolate, false),<br>↳ belief(Id2, adam, be, fat, false). |
| Show error "Not at school" if Adam is a student and he is at home from 8 to 15. | error(Id1, Id2, 'Not at school') :-<br>↳ type(adam, student),<br>↳ timeof(Id2, 8),<br>↳ timeof(Id2, 15),<br>↳ location(Id2, home),<br>↳ belief(Id2, adam, be, null, false). |
| Show error "Not wearing helmet" if Adam sings in space and he does not wear a helmet. | error(Id1, Id2, 'Not wearing helmet') :-<br>↳ location(Id1, space),<br>↳ belief(Id1, adam, sing, null, false),<br>↳ belief(Id2, adam, wear, helmet, true). |

Character sheets contain descriptions and stories of single characters that have happened before the actual story has started. They are created while making use of parsing scheme used in actions. Character sheets allow scriptwriters to add more background information about a character, which they may not necessarily use in the script itself. Moreover, each action is added to the specified actor's character system, which allows for information contained in the character sheet to be used in the character's reasoning capabilities as well.

Figure 12:
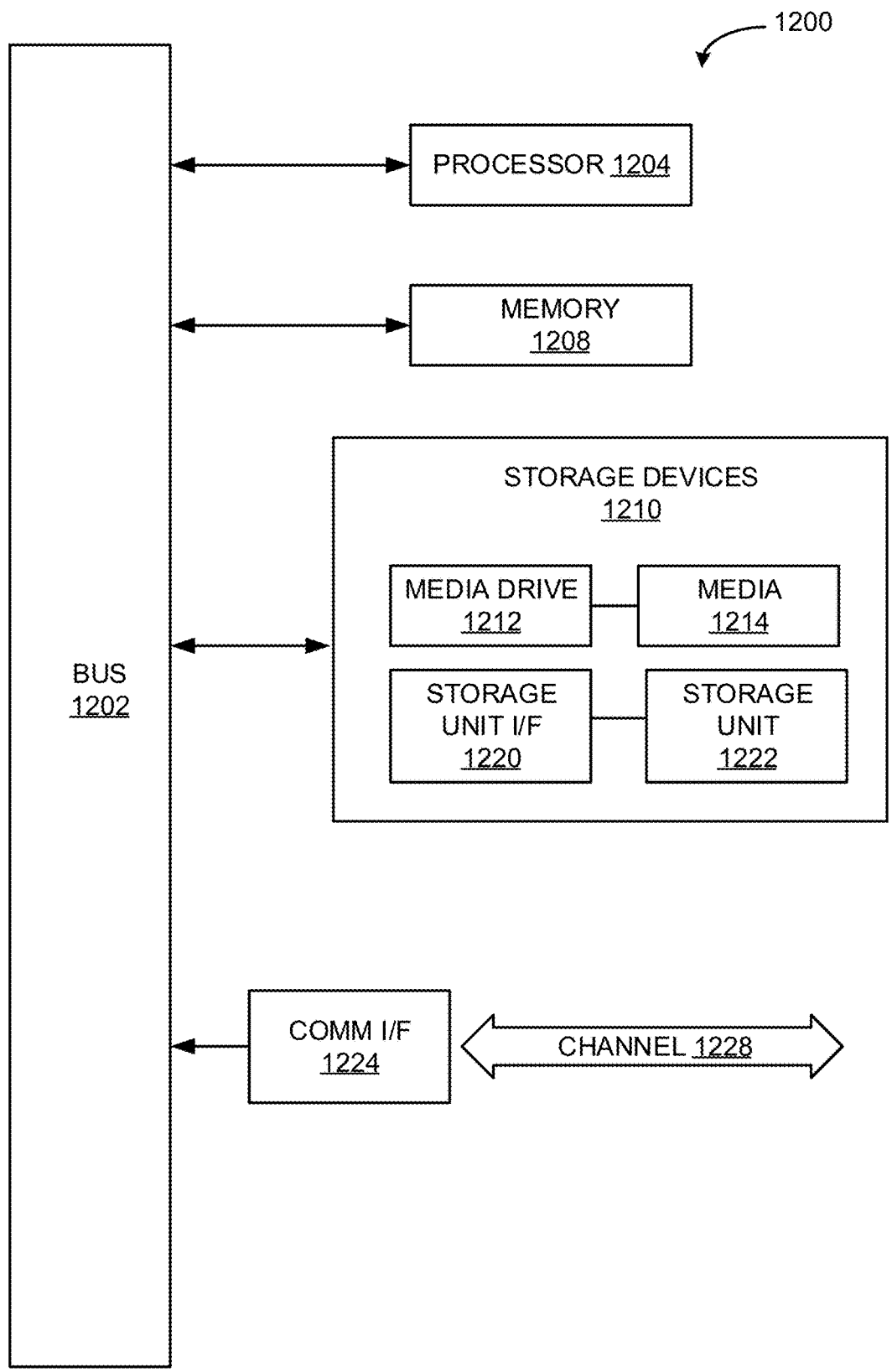
FIG. 12 is an example computing component that may be used to implement various features of embodiments described in the present disclosure.

FIG. 12 illustrates an example computing component that may be used to implement various features of the system and methods disclosed herein, for example, one or more elements of system 200 and/or 400, a user device in which frontend application/UI 202 may be implemented, backend server 210, data library 220, preview device 222, application launcher 428, AR/VR components 432/434, NLP core 224, etc.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 12. Various embodiments are described in terms of this example-computing component 1200. After reading this description, it will become apparent to a person skilled in the relevant art how to implement the application using other computing components or architectures.

Referring now to FIG. 12, computing component 1200 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 1200 might also represent computing capabilities embedded within or otherwise available to a given device. For example, a computing component might be found in other electronic devices such as, for example navigation systems, portable computing devices, and other electronic devices that might include some form of processing capability.

Computing component 1200 might include, for example, one or more processors, controllers, control components, or other processing devices, such as a processor 1204. Processor 1204 might be implemented using a general-purpose or special-purpose processing engine such as, for example, a microprocessor, controller, or other control logic. In the illustrated example, processor 1204 is connected to a bus 1202, although any communication medium can be used to facilitate interaction with other components of computing component 1200 or to communicate externally.

Computing component 1200 might also include one or more memory components, simply referred to herein as main memory 1208. For example, preferably random access memory (RAM) or other dynamic memory, might be used for storing information and instructions to be executed by processor 1204. Main memory 1208 might also be used for storing temporary variables or other intermediate information during execution of instructions to be executed by processor 1204. Computing component 1200 might likewise include a read only memory ("ROM") or other static storage device coupled to bus 1202 for storing static information and instructions for processor 1204.

The computing component 1200 might also include one or more various forms of information storage mechanism 1210, which might include, for example, a media drive 1212 and a storage unit interface 1220. The media drive 1212 might include a drive or other mechanism to support fixed or removable storage media 1214. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 1214 might include, for example, a hard disk, an integrated circuit assembly, magnetic tape, cartridge, optical disk, a CD or DVD, or other fixed or removable medium that is read by, written to or accessed by media drive 1212. As these examples illustrate, the storage media 1214 can include a computer usable storage medium having stored therein computer software or data.

In alternative embodiments, information storage mechanism 1210 might include other similar instrumentalities for allowing computer programs or other instructions or data to be loaded into computing component 1200. Such instrumentalities might include, for example, a fixed or removable storage unit 1222 and an interface 1220. Examples of such storage units 1222 and interfaces 1220 can include a program cartridge and cartridge interface, a removable memory (for example, a flash memory or other removable memory component) and memory slot, a PCMCIA slot and card, and other fixed or removable storage units 1222 and interfaces 1220 that allow software and data to be transferred from the storage unit 1222 to computing component 1200.

Computing component 1200 might also include a communications interface 1224. Communications interface 1224 might be used to allow software and data to be transferred between computing component 1200 and external devices. Examples of communications interface 1224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1224 might typically be carried on signals, which can be electronic, electromagnetic (which includes optical) or other signals capable of being exchanged by a given communications interface 1224. These signals might be provided to communications interface 1224 via a channel 1228. This channel 1228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1208, storage unit 1220, media 1214, and channel 1228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1200 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A computer-implemented method, comprising:
   determining one or more data elements of a script based on text in the script, wherein the one or more data elements include one or more of actions, interactions, or dialog in the script;
   determining one or more rule definitions associated with the script, wherein each rule definition specifies a rule for one or more characters or objects in the script;
   generating a knowledge base associated with the script and comprising information inferred from the one or more data elements and the one or more rule definitions;
   receiving one or more user queries regarding the script; and generating output corresponding to the one or more user queries based on the information in the knowledge base.

2. The computer-implemented method of claim 1, further comprising identifying the text in the script and correlating the identified text to one or more of a character, an action, or a location relevant to a scene of the script.

3. The computer-implemented method of claim 1, wherein the identifying of the text in the script comprises parsing the text in the script to extract single words of the text.

4. The computer-implemented method of claim 3, wherein the parsing of the text in the script to extract the single words of the text comprises applying co-reference resolution to the text.

5. The computer-implemented method of claim 1, further comprising building relationships between the one or more data elements of the script.

6. The computer-implemented method of claim 1, wherein the script is written in a natural language format.

7. The computer-implemented method of claim 6, wherein generating the knowledge base comprises applying natural language processing to the script to obtain information regarding each of the one or more data elements of the script.

8. The computer-implemented method of claim 7, wherein the obtained information is stored as basic information elements.

9. The computer-implemented method of claim 8, wherein each basic information element comprises one or more of an ID, time point information, coordinates information, location information, subject information, relationship information, object information, a relational modifier, a relational object, a relational question, a negation flag, or speaker information.

10. The computer-implemented method of claim 8, further comprising characterizing the basic information elements as one of a belief fact, a desire fact, a location fact, a confidence fact, a coordinate fact, or a time fact.

11. The computer-implemented method of claim 8, further comprising comparing at least two of the basic information elements, and determining an existence of a similarity or a contradiction between the at least two of the basic information elements.

12. The computer-implemented method of claim 11, further comprising relating the at least two basic information elements in the knowledge base upon a determination of the existence of the similarity or the contradiction between the at least two basic information elements.

13. The computer-implemented method of claim 8, further comprising comparing at least two of the basic information elements, and calculating a relational factor characterizing a level of relatedness between the at least two basic information elements.

14. The computer-implemented method of claim 1, wherein a separate knowledge base is created for each of the one or more data elements of the script.

15. A system, comprising:
an analytics engine and a natural language processor configured to:
determine one or more data elements of a script based on text in the script, wherein the one or more data elements include one or more of actions, interactions, or dialog in the script;
determine one or more rule definitions associated with the script, wherein each rule definition specifies a rule for one or more characters or objects in the script;
generate a knowledge base associated with the script and comprising information inferred from the one or more data elements and the one or more rule definitions;
receive one or more user queries regarding the script; and
generate output corresponding to the one or more user queries based on the information in the knowledge base.

16. The system of claim 15, wherein the analytics engine is further configured to identify the text in the script.

17. The system of claim 16, wherein the analytics engine is configured to identify the text in the script by extracting metadata from the script, and is further configured to correlate the identified text to one or more of a character, an action, or a location relevant to a scene of the script.

18. The system of claim 17, wherein the analytics engine is trained using known or most-used words representative of the one or more of the character, the action, or the location relevant to the scene.

19. The system of claim 15, wherein the analytics engine and the natural language processor are further configured to build relationships between the one or more data elements of the script.

20. The system of claim 15, wherein the analytics engine and the natural language processor are further configured to create a separate knowledge base for each of the one or more data elements of the script.

* * * * *